(12) United States Patent
Song et al.

(10) Patent No.: US 11,874,564 B2
(45) Date of Patent: Jan. 16, 2024

(54) PATTERNED FILM, VARIABLE-TRANSMITTANCE DEVICE COMPRISING SAME, AND METHOD FOR PRODUCING VARIABLE-TRANSMITTANCE DEVICE

(71) Applicant: LG Chem, Ltd., Seoul (KR)

(72) Inventors: Cheolock Song, Daejeon (KR); Han Min Seo, Daejeon (KR); Nam Seok Bae, Daejeon (KR); Jinhong Kim, Daejeon (KR); Minjun Gim, Daejeon (KR)

(73) Assignee: LG Chem, Ltd.

( * ) Notice: Subject to any disclaimer, the term of this patent is extended or adjusted under 35 U.S.C. 154(b) by 95 days.

(21) Appl. No.: 17/764,687

(22) PCT Filed: Feb. 4, 2021

(86) PCT No.: PCT/KR2021/001475
§ 371 (c)(1),
(2) Date: Mar. 29, 2022

(87) PCT Pub. No.: WO2021/167273
PCT Pub. Date: Aug. 26, 2021

(65) Prior Publication Data
US 2022/0357607 A1    Nov. 10, 2022

(30) Foreign Application Priority Data
Feb. 18, 2020    (KR) .................. 10-2020-0019488

(51) Int. Cl.
*G02F 1/1339*    (2006.01)
*G02B 5/30*    (2006.01)
(Continued)

(52) U.S. Cl.
CPC ......... *G02F 1/1339* (2013.01); *G02B 5/3016* (2013.01); *G02F 1/1335* (2013.01); *G02F 1/1347* (2013.01); *G02F 2202/28* (2013.01)

(58) Field of Classification Search
CPC ............... G02F 1/1339; G02F 1/13392; G02F 1/13394; G02F 1/13396
(Continued)

(56) References Cited

U.S. PATENT DOCUMENTS 4,396,250 A    8/1983    Wada et al.
7,453,545 B2    11/2008    Kim et al.
(Continued)

FOREIGN PATENT DOCUMENTS

CN    001536398 A    10/2004
CN    107430301 A    12/2017
(Continued)

OTHER PUBLICATIONS

International Search Report for Application No. PCT/KR2021/001475 dated May 24, 2021, 2 pgs.

*Primary Examiner* — Christopher M Raabe
(74) *Attorney, Agent, or Firm* — Lerner David LLP

(57) ABSTRACT

A pattern film, a transmittance variable device comprising the same, and a method for manufacturing a transmittance variable device are disclosed herein. In some embodiments, a pattern film includes a first base layer, and a spacer pattern formed on the first base layer, wherein the spacer pattern comprises a partition wall spacer and a ball spacer, wherein the ball spacer is one of embedded in, partially embedded in, or in contact with the partition wall spacer, and wherein an area of the spacer pattern per unit area of the first base layer is 5% or greater to 17% or less.

15 Claims, 15 Drawing Sheets

(51) Int. Cl.
*G02F 1/1335* (2006.01)
*G02F 1/1347* (2006.01)

(58) Field of Classification Search
USPC .......................................................... 349/155
See application file for complete search history.

(56) References Cited

U.S. PATENT DOCUMENTS

| | | | |
|---|---|---|---|
| 7,936,437 | B2 | 5/2011 | Hong et al. |
| 10,295,878 | B2 | 5/2019 | Zhang et al. |
| 10,509,273 | B2 | 12/2019 | You et al. |
| 10,712,607 | B2 | 7/2020 | Lee et al. |
| 11,726,369 | B2 * | 8/2023 | Song .................. G02F 1/13398 428/166 |
| 2017/0097537 | A1 | 4/2017 | Park et al. |
| 2017/0108740 | A1 | 4/2017 | Kim et al. |
| 2018/0074377 | A1 | 3/2018 | You et al. |
| 2020/0150477 | A1 | 5/2020 | Iiyama et al. |
| 2020/0276750 | A1 | 9/2020 | Song et al. |
| 2020/0362623 | A1 | 11/2020 | Bae et al. |
| 2021/0311343 | A1* | 10/2021 | Song .................. G02F 1/13392 |

FOREIGN PATENT DOCUMENTS

| | | |
|---|---|---|
| EP | 0022311 A1 | 1/1981 |
| JP | 2000137229 A | 5/2000 |
| JP | 2000155321 A | 6/2000 |
| JP | 2005265926 A | 9/2005 |
| JP | 2010276925 A | 12/2010 |
| JP | 2011053552 A | 3/2011 |
| JP | 2012173308 A | 9/2012 |
| JP | 2012177802 A | 9/2012 |
| JP | 2018072852 A | 5/2018 |
| JP | 201939994 A | 3/2019 |
| JP | 2019527854 A | 10/2019 |
| KR | 20070089352 A | 8/2007 |
| KR | 20080081426 A | 9/2008 |
| KR | 101273890 B1 | 6/2013 |
| KR | 20160146566 A | 12/2016 |
| KR | 20170024745 A | 3/2017 |
| KR | 20190019843 A | 2/2019 |
| KR | 102010760 B1 | 8/2019 |
| KR | 20190122579 A | 10/2019 |
| TW | 201921062 A | 6/2019 |
| WO | 2015152694 A1 | 10/2015 |
| WO | 2019035636 A1 | 2/2019 |
| WO | WO-2023044885 A1 * | 3/2023 |

* cited by examiner

[FIG. 1]
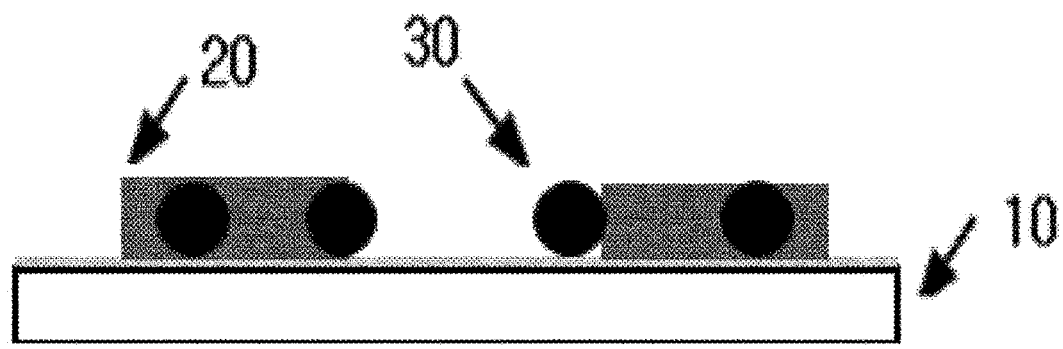
[FIG. 2A]
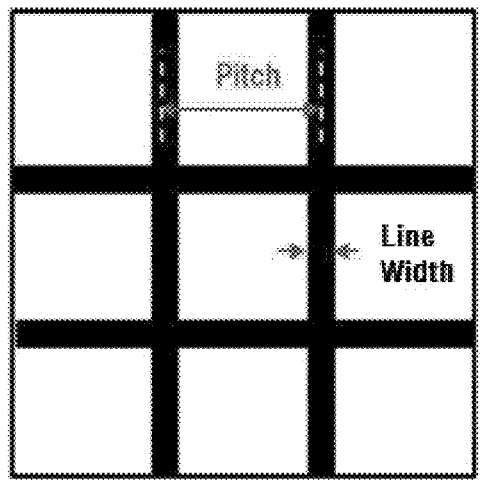
(Mesh pattern)
[FIG. 2B]
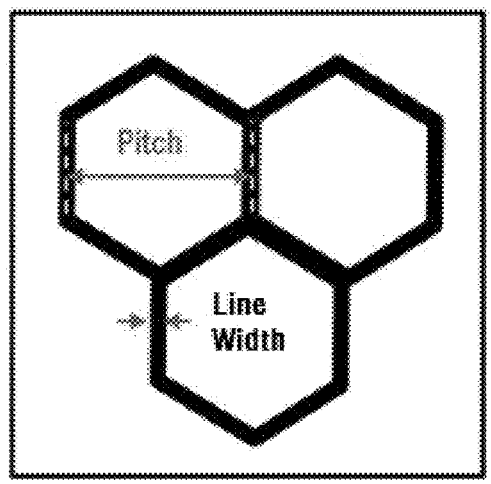
(Honeycomb pattern)

[FIG. 3]
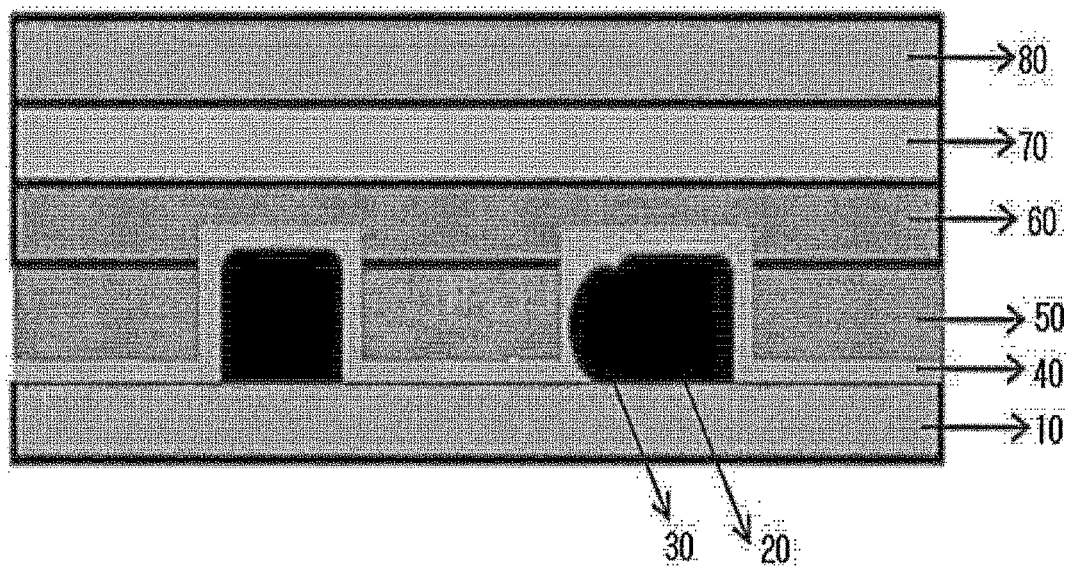
[FIG. 4]
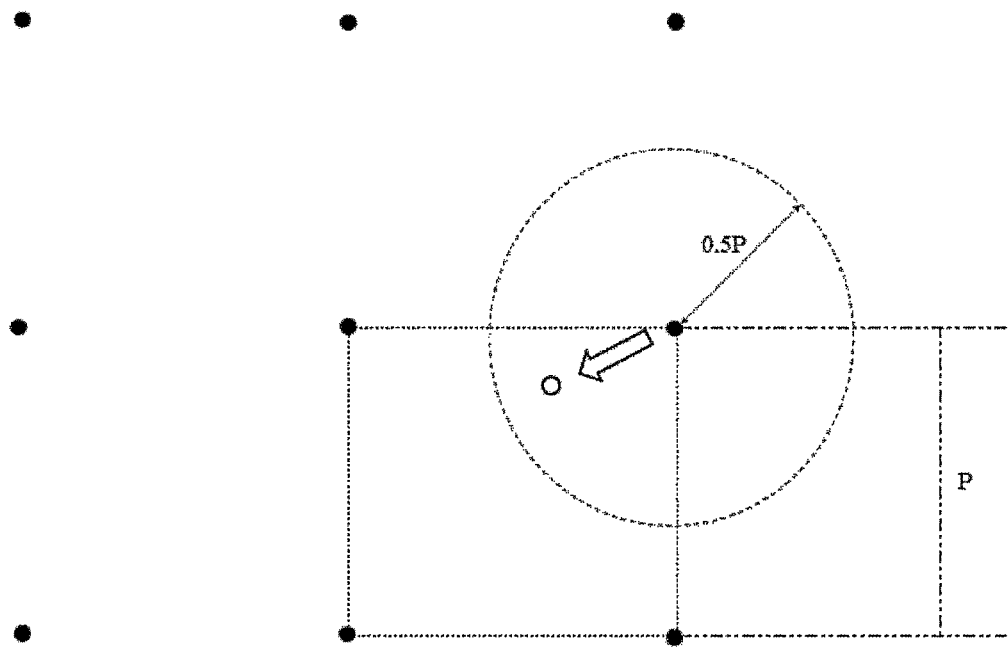

【FIG. 5】
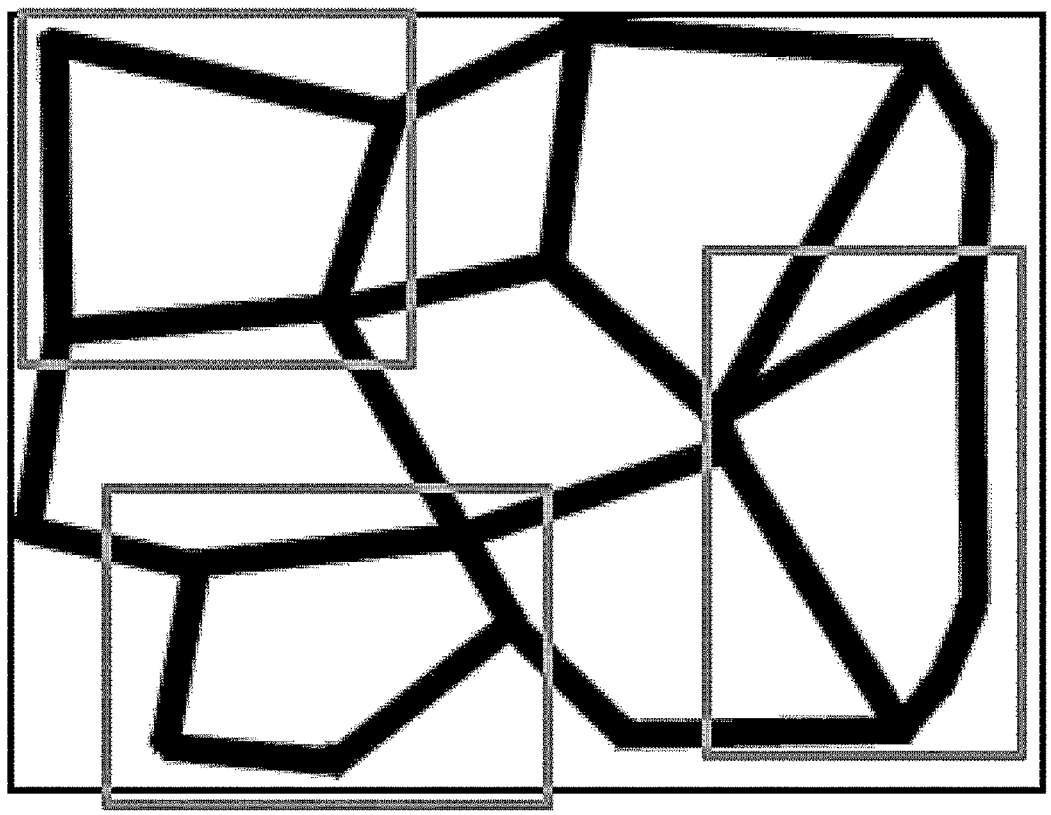

[FIG. 6]
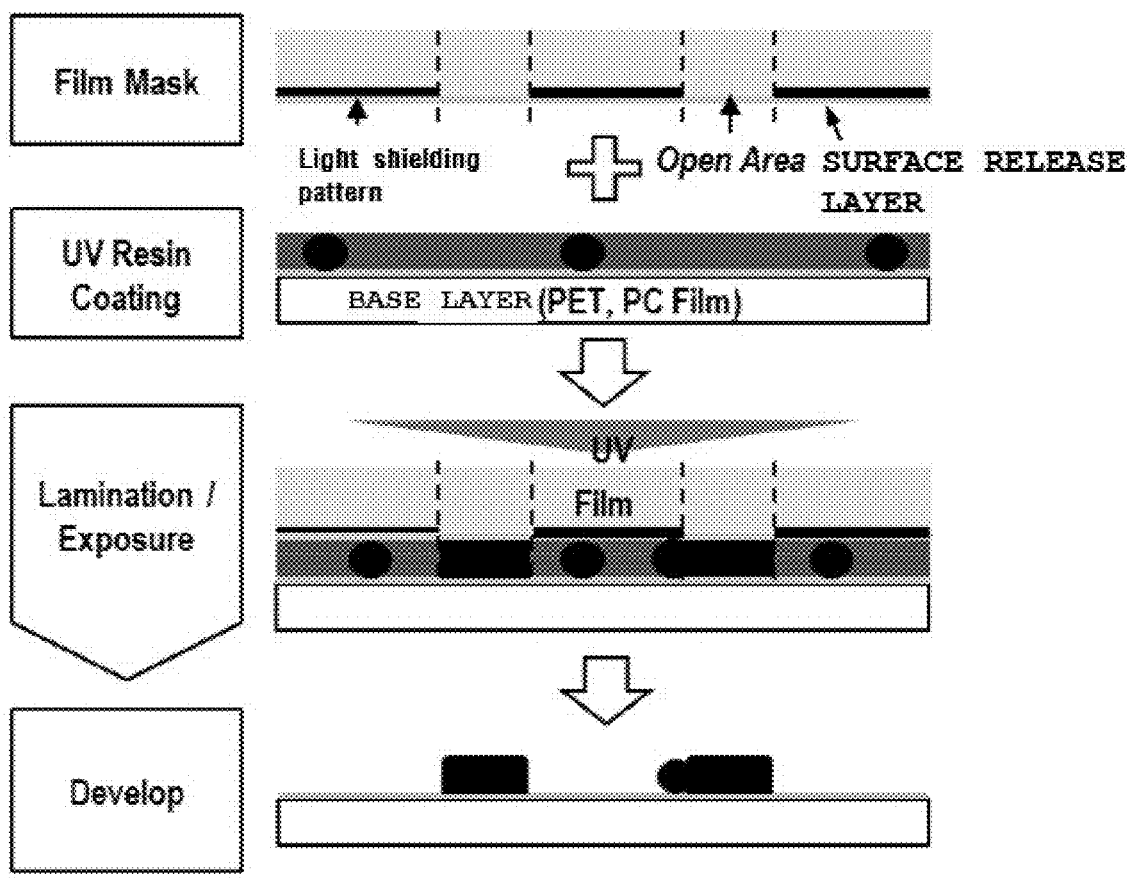

[FIG. 7A]
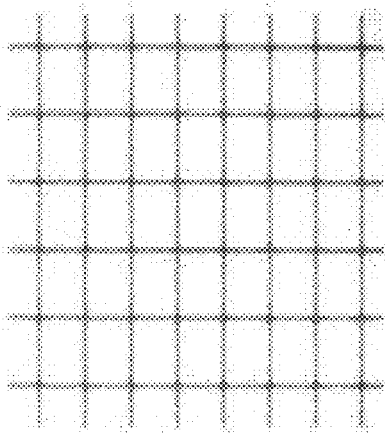
OPTICAL MICROSCOPE
50 MAGNIFICATIONS
[FIG. 7B]
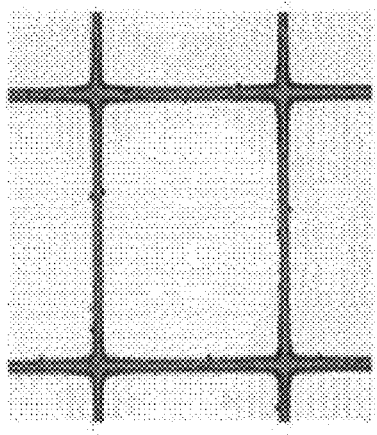
OPTICAL MICROSCOPE
200 MAGNIFICATIONS
[FIG. 8A]
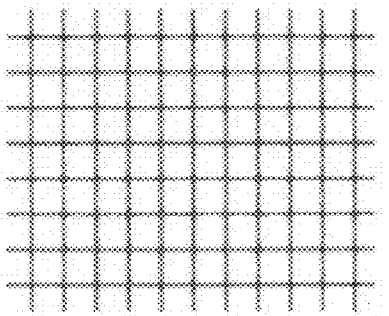
OPTICAL MICROSCOPE
50 MAGNIFICATIONS
[FIG. 8B]
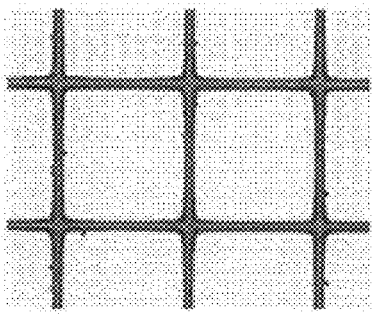
OPTICAL MICROSCOPE
200 MAGNIFICATIONS

[FIG. 9A]
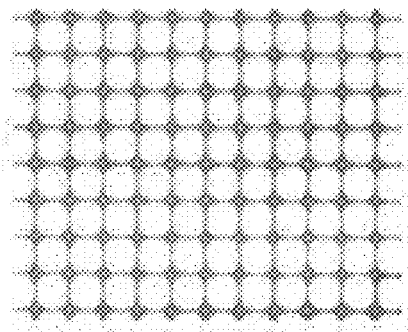
OPTICAL MICROSCOPE
50 MAGNIFICATIONS
[FIG. 9B]
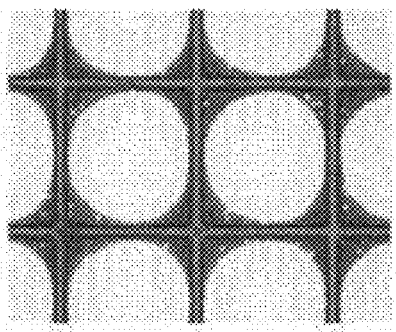
OPTICAL MICROSCOPE
200 MAGNIFICATIONS
[FIG. 10A]
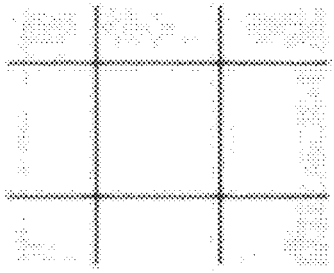
OPTICAL MICROSCOPE
50 MAGNIFICATIONS
[FIG. 10B]
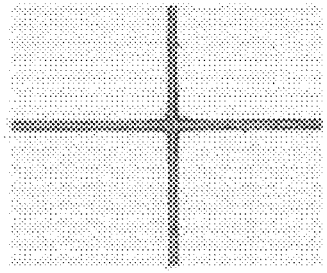
OPTICAL MICROSCOPE
200 MAGNIFICATIONS

[FIG. 11]
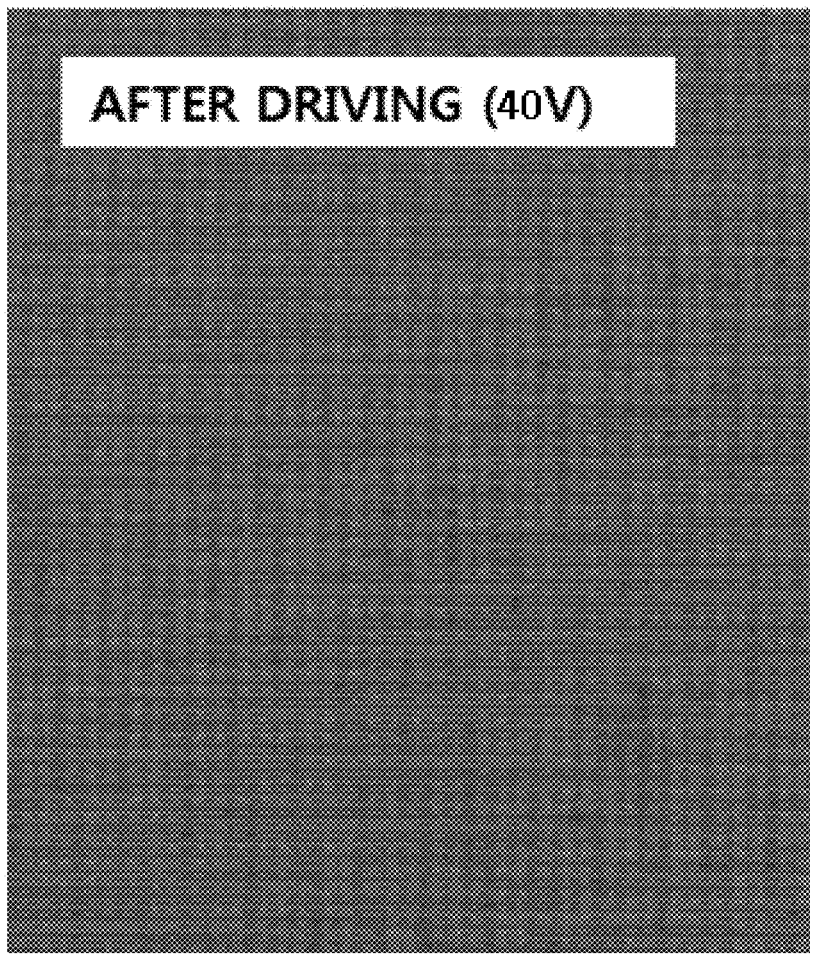

[FIG. 12]
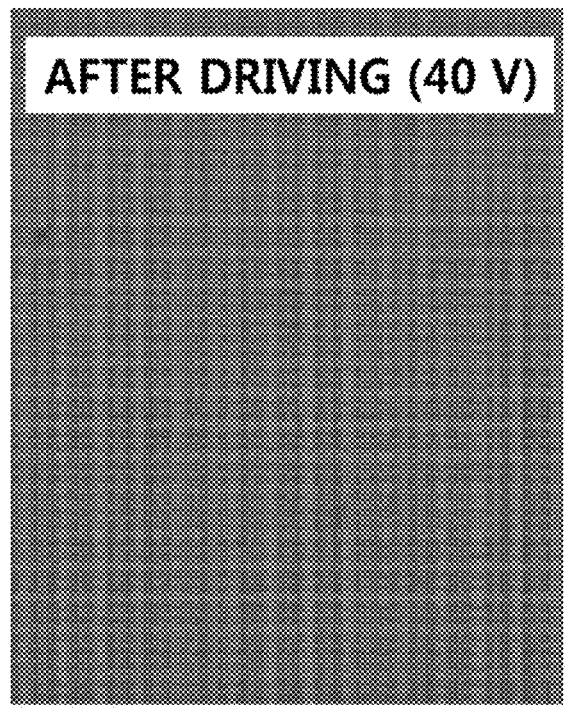

[FIG. 13]
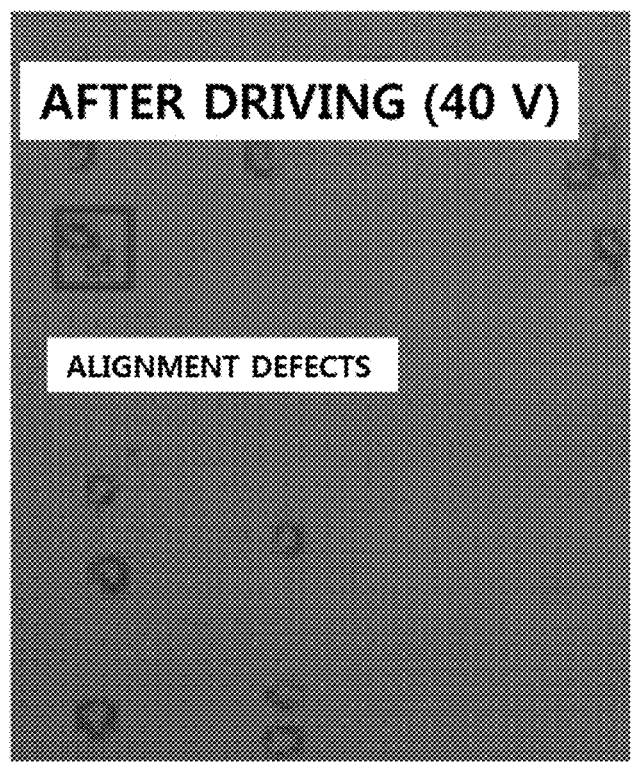

[FIG. 14]
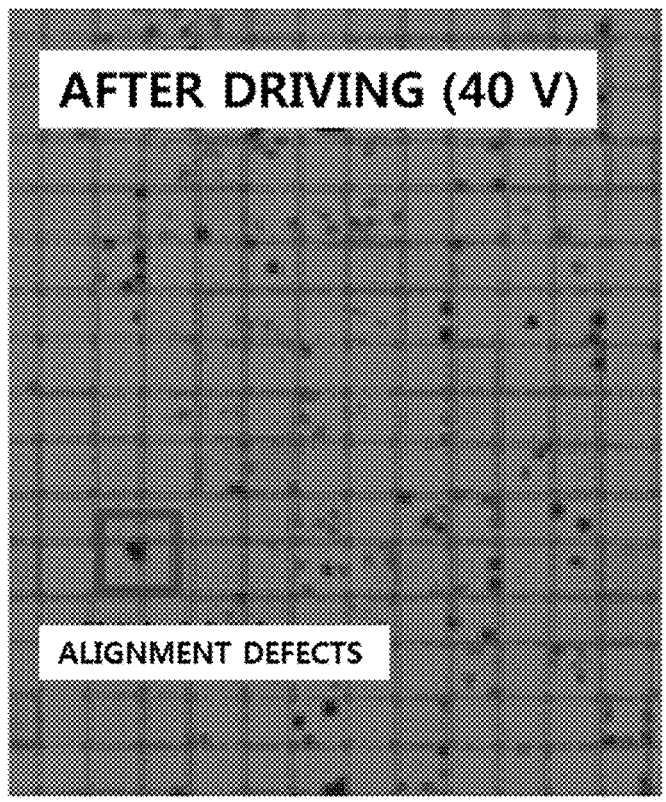
[FIG. 15A]
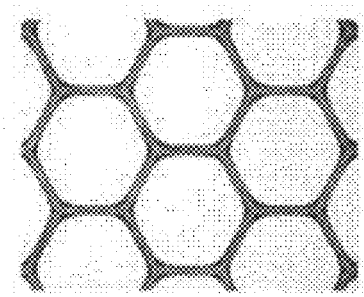
OPTICAL MICROSCOPE
50 MAGNIFICATIONS
[FIG. 15B]
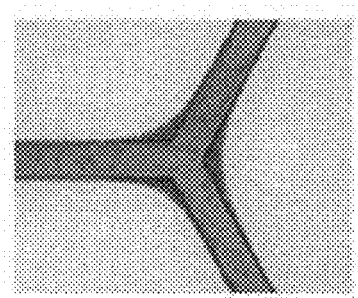
OPTICAL MICROSCOPE
200 MAGNIFICATIONS

[FIG. 16A]
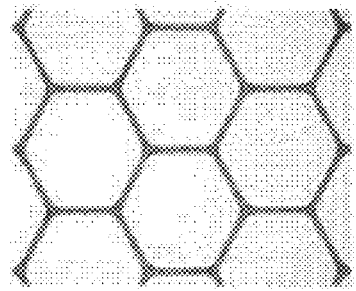
OPTICAL MICROSCOPE
50 MAGNIFICATIONS
[FIG. 16B]
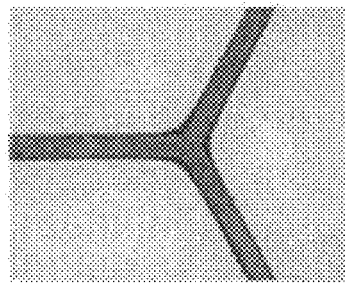
OPTICAL MICROSCOPE
200 MAGNIFICATIONS
[FIG. 17A]
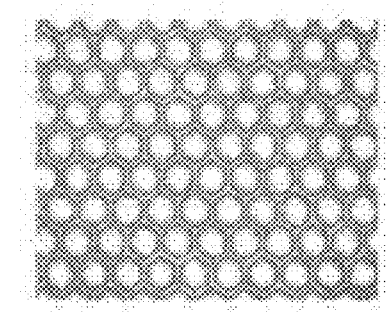
OPTICAL MICROSCOPE
50 MAGNIFICATIONS
[FIG. 17B]
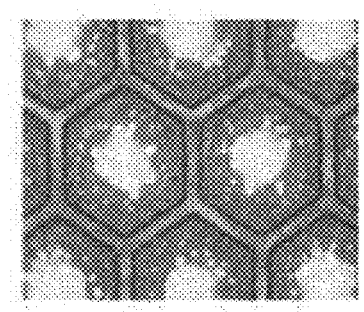
OPTICAL MICROSCOPE
200 MAGNIFICATIONS
[FIG. 18A]
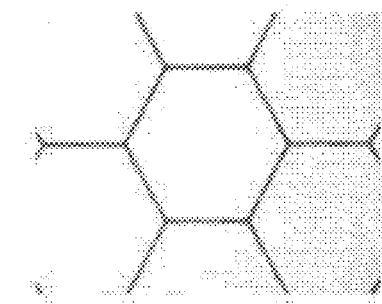
OPTICAL MICROSCOPE
50 MAGNIFICATIONS
[FIG. 18B]
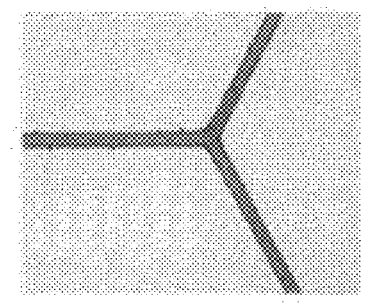
OPTICAL MICROSCOPE
200 MAGNIFICATIONS

[FIG. 19]
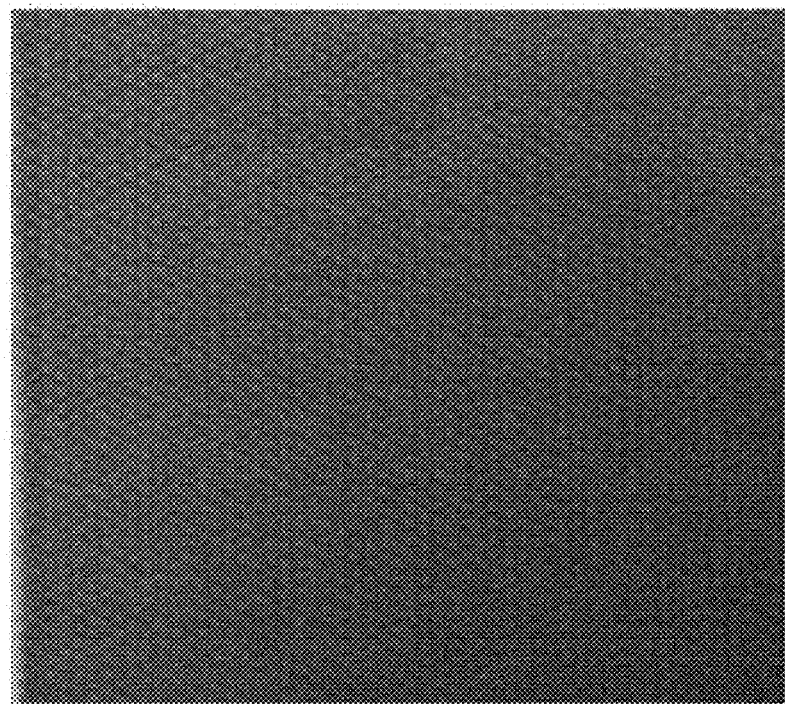

[FIG. 20]
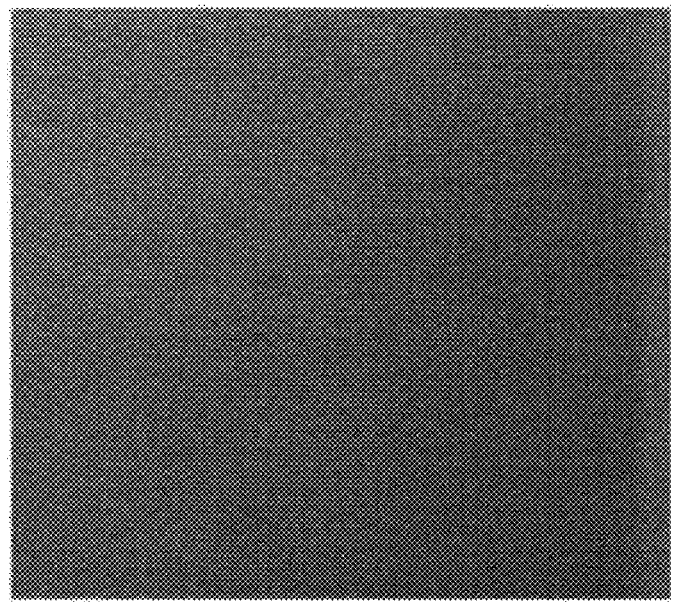
BEFORE DRIVING (0 V)

[FIG. 21]
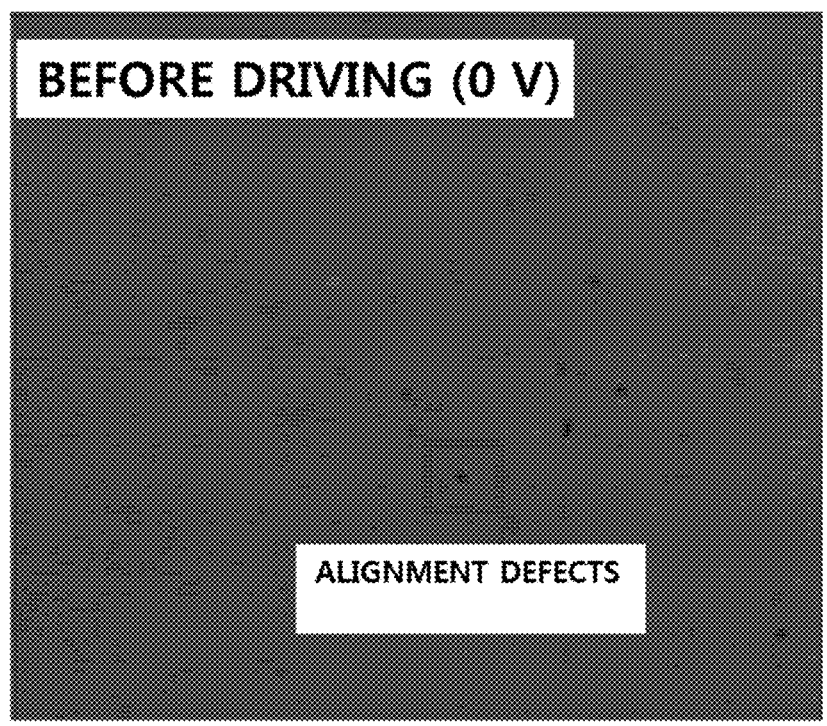

[FIG. 22]
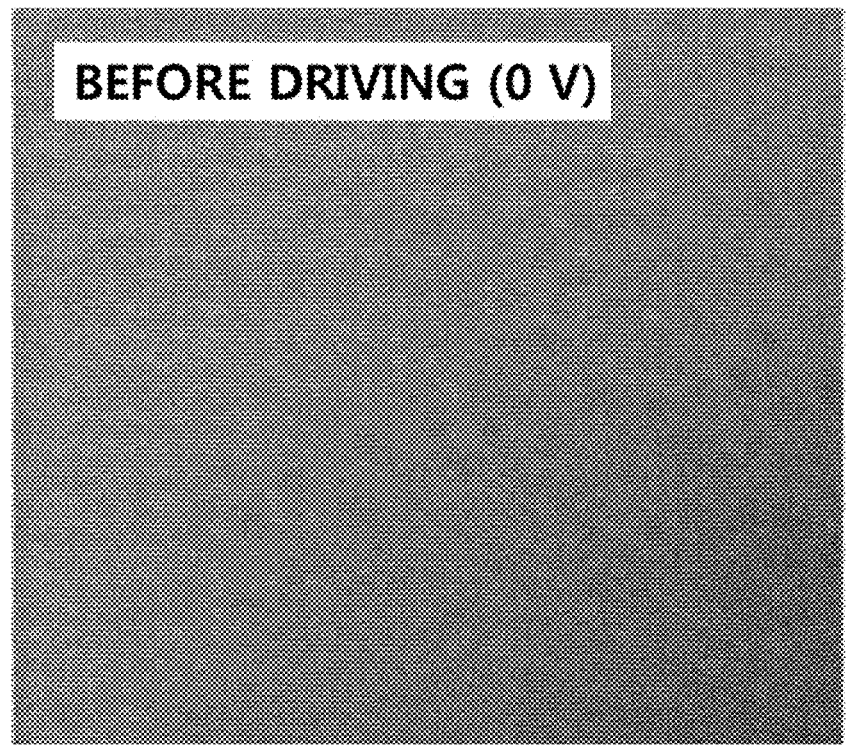

PATTERNED FILM, VARIABLE-TRANSMITTANCE DEVICE COMPRISING SAME, AND METHOD FOR PRODUCING VARIABLE-TRANSMITTANCE DEVICE

CROSS-REFERENCE TO RELATED APPLICATIONS

This application is a national phase entry under 35 U.S.C. § 371 of International Application No. PCT/KR2021/001475, filed on Feb. 4, 2021, which claims priority from Korean Patent Application No. 10-2020-0019488, filed on Feb. 18, 2020, the entire contents of which are incorporated herein by reference.

TECHNICAL FIELD

The present specification relates to a pattern film, a transmittance variable device comprising the same, and a method for manufacturing a transmittance variable device.

BACKGROUND ART

A transmittance variable device may mean a functional film capable of adjusting transmittance of sunlight.

A transmittance variable device means a device capable of switching between at least two or more different states. Such a device is used in, for example, eyewear such as glasses or sunglasses, mobile devices, wearable devices such as devices for virtual reality (VR) or devices for augmented reality (AR), or vehicular sunroofs, and the applications are gradually expanding.

A transmittance variable device readily transmit and block light coming from the outside, and may be used as a light-shielding film of smart windows for construction, sunroofs for motor vehicles and transparent displays. At this time, it is essential that the transmittance variable device maintains a constant cell gap between both substrates.

A method for maintaining a cell gap comprises a ball spacer. However, a ball spacer causes issues of appearance defects occurring when a film is placed vertically over a large area as a liquid phase is shifted to the bottom due to gravity. Accordingly, in the field of transmittance variable device, studies to resolve issues of appearance defects through technologies of patterning a partition wall having a mesh or honeycomb structure have been progressed.

Meanwhile, developments to lower a spacer area that does not participate in transmittance variableness have been attempted in order to increase visibility of a transmittance variable device, however, as a space between patterns increases, issues of appearance defects occur due to an occurrence of cell gap difference between the pattern surroundings and the central part between the patterns. In order to resolve this problem, studies in a direction of flatly and firmly fixing the film by introducing a conductive adhesive to the upper part of the transmittance variable device pattern have also been progressed.

As described above, the pattern area needs to be optimized in order to manufacture a transmittance variable film, and the pattern structure or manufacturing method needs to be changed as well. Through this, it is necessary to resolve problems in the driving of a transmittance variable device caused by contrast defects and alignment defects resulted by failing to maintain a cell gap.

Accordingly, studies to increase visibility of a transmittance variable device while maintaining a cell gap have still been progressed.

PRIOR ART DOCUMENTS

Patent Documents (Patent Document 1) European Patent Application Laid-Open Publication No. 0022311

DISCLOSURE

Technical Problem

The present specification relates to a pattern film, a transmittance variable device comprising the same, and a method for manufacturing a transmittance variable device.

Technical Solution

One embodiment of the present application provides a pattern film comprising a first base layer; and a spacer pattern formed on the first base layer, wherein the spacer pattern comprises a partition wall spacer and a ball spacer, the ball spacer is included in a form of being embedded in, partially embedded in or in contact with the partition wall spacer, and a unit area ratio of a unit area of the spacer pattern to unit area of the first base layer is 5% or greater and 17% or less.

Another embodiment provides a transmittance variable device comprising the pattern film according to the present application; and a second substrate disposed opposite to the pattern film, wherein the first base layer of the pattern film and the second substrate are separated by a space, wherein the space is maintained by the spacer pattern of the pattern film.

Lastly, one embodiment of the present application provides a method for manufacturing a transmittance variable device, the method comprising preparing the pattern film according to the present application; forming a first laminate by forming an alignment film on the spacer pattern of the first base layer of the pattern film so as to cover the spacer pattern; forming a second laminate by forming an adhesive layer on a laminate of a second base layer and a transparent layer; laminating the first laminate and the second laminate so that the adhesive layer of the second laminate is in contact with the alignment film of the first laminate, where the spacer pattern maintains a space between the first base layer of the first laminate and the adhesive layer of the second laminate; and forming a light modulation layer in the space.

Advantageous Effects

In a pattern film according to one embodiment of the present application, a spacer pattern comprises a partition wall spacer and a ball spacer, and a unit area ratio of a unit area of the spacer pattern to a unit area of a first base layer is 5% or greater and 17% or less, which resolves contrast defects and alignment defects of a transmittance variable device comprising the same by introducing a specific area ratio while maintaining a cell gap, and as a result, the transmittance variable film has favorable driving.

DESCRIPTION OF DRAWINGS

FIG. 1 is a diagram illustrating a side view of a pattern film according to one embodiment of the present application.

FIG. 2A is a diagram illustrating a shape of a spacer pattern according to one embodiment of the present application.

FIG. 2B is a diagram illustrating a shape of a spacer pattern according to one embodiment of the present application.

FIG. 3 is a diagram illustrating a lamination structure of a transmittance variable device according to one embodiment of the present application.

FIG. 4 is a diagram relating to a method of operating 50% irregularity of a tetragonal spacer pattern.

FIG. 5 is a diagram illustrating a pattern after operating 50% irregularity of a tetragonal spacer pattern.

FIG. 6 is a diagram schematically illustrating a process for manufacturing a pattern film according to one embodiment of the present application.

FIG. 7A and FIG. 7B are diagrams showing optical microscope images of 50 magnifications and 200 magnifications for pattern films of Example 1.

FIG. 8A and FIG. 8B are diagrams showing optical microscope images of 50 magnifications and 200 magnifications for pattern films of Example 2.

FIG. 9B and FIG. 9B are diagrams showing optical microscope images of 50 magnifications and 200 magnifications for pattern films of Comparative Example 1.

FIG. 10A and FIG. 10B are diagrams showing optical microscope images of 50 magnifications and 200 magnifications for pattern films of Comparative Example 2.

FIG. 11 to FIG. 14 are diagrams obtained by observing appearances of transmittance variable devices using pattern films of Example 1, Example 2, Comparative Example 1 and Comparative Example 2 of the present application after driving at 40 V.

FIG. 15A and FIG. 15B are diagrams showing optical microscope images of 50 magnifications and 200 magnifications for pattern films of Example 3.

FIG. 16A and FIG. 16B are diagrams showing optical microscope images of 50 magnifications and 200 magnifications for pattern films of Example 4.

FIG. 17A and FIG. 17B are diagrams showing optical microscope images of 50 magnifications and 200 magnifications for pattern films of Comparative Example 3.

FIG. 18A and FIG. 18B are diagrams showing optical microscope images of 50 magnifications and 200 magnifications for pattern films of Comparative Example 4.

FIG. 19 to FIG. 22 are diagrams obtained by observing appearances of transmittance variable devices using pattern films of Example 3, Example 4, Comparative Example 3 and Comparative Example 4 of the present application before driving (0 V).

<Reference Numeral>
10: First Base Layer
20: Partition Wall Spacer
30: Ball Spacer
40: Alignment Film
50: Light Modulation Layer
60: Adhesive Layer
70: Transparent Layer
80: Second Base Layer

MODE FOR DISCLOSURE

Hereinafter, the present specification will be described in more detail.

Embodiments of the present disclosure will be described in detail with reference to accompanying drawings so that those skilled in the art readily implement the present disclosure. However, the present disclosure may be embodied to various different forms, and is not limited to the embodiments described herein.

One embodiment of the present application provides a pattern film comprising a first base layer; and a spacer pattern formed on the first base layer, wherein the spacer pattern comprises a partition wall spacer and a ball spacer, the ball spacer is included in a form of being embedded in, partially embedded in or in contact with the partition wall spacer, and an area of the spacer pattern per unit area of the first base layer is 5% or greater and 17% or less.

In the pattern film according to one embodiment of the present application, the spacer pattern comprises a partition wall spacer and a ball spacer, and a unit area ratio of a unit area of the spacer pattern to a unit area of the first base layer is 5% or greater and 17% or less, which resolves contrast defects and alignment defects of a transmittance variable device comprising the same by introducing a specific area ratio while maintaining a cell gap, and as a result, the transmittance variable film has favorable driving.

In one embodiment of the present application, the unit area ratio of the unit area of the spacer pattern to the unit area of the first base layer being 5% or greater and 17% or less means a ratio of the area where the spacer pattern included in a specific unit area of the first base layer is formed, and, for example, when the area where the pattern is formed is 10 $mm^2$ based on the unit area of 100 $mm^2$ of the first base layer, the area ratio of the spacer pattern may be defined as 10%.

In other words, the spacer pattern having a unit area ratio of X % may satisfy an equation of B/A×100=X % when a specific unit area of the first base layer is defined as A, and an area of the spacer pattern included in the specific unit area of the first base layer is defined as B, and may mean a ratio of the area of the spacer pattern formed on the first base layer when the total area of the first base layer is based on 100.

In one embodiment of the present application, the area ratio of the unit area of the spacer pattern to the unit area of the first base layer may satisfy 5% or greater and 17% or less, preferably 6% or greater and 17% or less, and more preferably 7% or greater and 17% or less.

By the area ratio of the unit area of the spacer pattern to the unit area of the first base layer satisfying the above-mentioned range, properties of superior appearances are obtained by having superior contrast in the transmittance variable device comprising the same afterward.

In the pattern film provided in one embodiment of the present application, the spacer pattern is a regular pattern; or an irregular pattern.

In one embodiment of the present application, the spacer pattern may be a regular pattern.

In one embodiment of the present application, the spacer pattern may be an irregular pattern.

In one embodiment of the present application, the partition wall spacer is formed with a plurality of spacer dots and a spacer line connecting the spacer dots. The spacer dot in the present application is used as a factor for adjusting regularity or irregularity, and when the spacer pattern connected by the spacer line is formed, the spacer line and the spacer dot may be expressed as the partition wall spacer.

Specifically, a method of operating the irregularity is as follows.

In one embodiment of the present application, the partition wall spacer being an irregular pattern and the partition wall spacer having irregularity of 50% means the spacer dot used as an adjustment factor having irregularity of 50%, and, in disposing each of the spacer dots, means to have an irregular spacer pattern by randomly moving the spacer dot within a circular area having a radius of 50% (0.5 pitch) of a normal pitch of the selected spacer dot.

In other words, the spacer pattern having irregularity of X % may mean the spacer dot having irregularity of X %, and may mean that irregularity of X % is satisfied by randomly moving the spacer dot within a circular area having a radius of X % (0.X pitch) of a normal pitch of the selected spacer dot.

Specifically, the method of operating the regularity and the irregularity is as follows.

The spacer dot may be designed in the following manner using a random number coordinate generation program (CAD). First, on a base layer having a total area of approximately 10 mm, 100 dots are disposed regularly in a tetragonal (mesh) or hexagonal arrangement with a space (pitch) of 280 μm and 940 μm.

When forming a partition wall spacer pattern by regularly forming spacer dots as above and then forming a spacer line by connecting the spacer dots, the spacer pattern has irregularity of 0%, that is, the spacer pattern may be defined to have a regular pattern.

In the tetragonal arrangement, irregularity of the spacer pattern may be adjusted by setting a program so that an individual spacer dot in the square formed by randomly selecting 4 spacer dots randomly moves within a circular area having a radius of 50% (0.5 P) or a radius of 70% (0.7 P) of a normal pitch (P) based on each spacer to move the individual spacer dot, and a spacer pattern disposition having irregularity (50% or 70%) is formed. In the hexagonal arrangement, only the formation of regular hexagon formed by selecting 6 spacer dots is different, and the rest of the process is the same as the tetragonal arrangement.

A final spacer pattern is completed by setting a diameter of the individual spacer dot and forming a spacer line connecting the spacer dots. The spacer pattern formed herein may be a pentagonal or a hexagonal pattern as well as a tetragonal pattern, and as the hexagonal arrangement pattern, a tetragonal, a pentagonal or a heptagonal pattern may be formed as well as the hexagon.

FIGS. 2A-B are top views illustrating a case where the spacer dot has a regular pattern. Specifically, FIG. 2A is a top view when having a mesh pattern and FIG. 2B is a top view when having a honeycomb pattern, and a normal pitch and a line width of each of the patterns may be identified.

FIG. 4 is a diagram relating to the method of operating 50% irregularity of the tetragonal spacer pattern. In other words, it may be identified that, in the tetragonal arrangement, a spacer disposition pattern having irregularity (50%) is formed by setting a program so that an individual spacer dot in the square formed by randomly selecting 4 spacer dots randomly moves within a circular area having a radius of 50% (0.5 P) of a normal pitch (P) based on each spacer to move the individual spacer dot.

FIG. 5 is a diagram illustrating a pattern after operating 50% irregularity of the tetragonal spacer pattern. Specifically, it is a pattern having 50% irregularity of the tetragonal spacer pattern formed through the operation of FIG. 4, and unlike FIG. 2, it may be identified that the pitch space becomes different.

In one embodiment of the present application, when the spacer pattern has an irregular pattern, the spacer pattern may have irregularity of 50% or greater, and less than 90%. In another embodiment, the spacer pattern may have irregularity of 50% or greater and less than 90%, preferably 50% or greater and less than 80%, and more preferably 50% or greater and less than 75%.

In the pattern film according to one embodiment of the present application, the spacer pattern comprises a partition wall spacer and a ball spacer, and by the irregularity of the spacer pattern satisfying the above-mentioned range, the pattern structure is expanded to comprise various patterns from one type of pattern of existing tetragon (mesh) or hexagon (honeycomb), and by introducing irregularity, a transmittance variable device comprising the same has properties of excellent visibility with reduced diffused reflection since a diffraction phenomenon is improved.

FIG. 1 illustrates a side view of the pattern film according to one embodiment of the present application. The pattern film has a spacer pattern on a base layer (10), and it may be identified that the spacer pattern comprises a partition wall spacer (20) and a ball spacer (30), and the ball spacer is included in a form of being embedded in, partially embedded in or in contact with the at least one partition wall spacer.

Particularly, the form of ball spacer inclusion may be specifically identified in FIG. 1, and the ball spacer being embedded in the partition wall spacer means a form of being completely embedded inside, and being partially embedded means a form of the ball spacer being embedded inside the partition wall spacer and a part of the ball spacer being exposed to the outside, and being included in a form of being in contact means one surface of the partition wall spacer being in contact with one surface of the ball spacer.

In the pattern film provided in one embodiment of the present application, an average value of a height (H) of the partition wall spacer is 2 μm or greater and 100 μm or less, and a standard deviation of the height of the partition wall spacer is 0.05 μm or greater and 0.5 μm or less.

In another embodiment, an average value of the height (H) of the partition wall spacer may be 2 μm or greater and 100 μm or less, preferably 5 μm or greater and 90 μm or less, and more preferably 10 μm or greater and 80 μm or less.

In another embodiment, a standard deviation of the height of the partition wall spacer may be 0.05 μm or greater and 0.5 μm or less, preferably 0.05 μm or greater and 0.4 μm or less, and more preferably 0.05 μm or greater and 0.3 μm or less.

In the pattern film provided in one embodiment of the present application, a line width of the spacer pattern is 10 μm or greater and 200 μm or less.

The line width of the spacer pattern may be, for example, from 10 μm to 200 μm, and, in another example, may be 12 μm or greater, 13 μm or greater, 14 μm or greater, 15 μm or greater, 16 μm or greater, 17 μm or greater, 18 μm or greater, 19 μm or greater, 20 μm or greater, 21 μm or greater, 22 μm or greater, 23 μm or greater, 24 μm or greater, 25 μm or greater or 26 μm or greater, or 200 μm or less, 195 μm or less, 180 μm or less, 170 μm or less, 160 μm or less, 150 μm or less, 149 μm or less, 148 μm or less, 147 μm or less or 146 μm or less.

In the pattern film provided in one embodiment of the present application, a pitch of the spacer pattern may be 50 μm or greater and 1,500 μm or less.

The pitch of the spacer pattern may be, for example, 50 μm or greater and 1,500 μm or less, and, in another example, may be 50 μm or greater, 100 μm or greater, 150 μm or greater, 200 μm or greater, 250 μm or greater or 280 μm or greater, or 1,500 μm or less, 1,400 μm or less or 1,000 μm or less.

The pitch and the line width of the spacer pattern may be properly selected within a range that does not impair purposes of the present application.

In the pattern film provided in one embodiment of the present application, a line width (T) of the partition wall of the partition wall spacer and an average particle diameter (D) of the ball spacer satisfy the following Equation 1.

$$1.0 \le T/D \le 20 \quad \text{[Equation 1]}$$

When the pattern film according to one embodiment of the present application satisfies Equation 1, a degree of curing of the lower portion of the partition wall spacer is suitable, which leads to properties of preventing the lower portion of the spacer pattern from being separated from the first base layer by a stripper solution, a cleaning solution or a development pressure (1 bar or greater) used in a subsequent process (development process). In other words, when Equation 1 has a value of less than 1.0, a degree of curing of the lower portion of the partition wall spacer is not sufficient, which may cause a problem of losing the partition wall spacer through the lower portion of the spacer pattern being separated from the first base layer by a stripper solution, a cleaning solution or a development pressure (1 bar or greater) used in a subsequent process (development process). When Equation 1 is greater than 20, an overcuring phenomenon occurs at an intersection (spacer dot section) of the partition wall spacer resulting in curing in areas other than the partition wall spacer, which may cause a problem of making the manufacture of the partition wall spacer through selective exposure/development difficult.

In one embodiment of the present application, the line width (T) of the partition wall spacer may be properly adjusted considering transmittance variableness of a transmittance variable device comprising the same afterward.

Specifically, the line width (T) of the partition wall of the partition wall spacer may be from 10 µm to 200 µm, and, in another example, may be 20 µm or greater, 30 µm or greater, 40 µm or greater, 50 µm or greater, 60 µm or greater, 70 µm or greater or 80 µm or greater, or 190 µm or less, 180 µm or less, 170 µm or less, 160 µm or less, 150 µm or less, 140 µm or less, 130 µm or less, 120 µm or less, 110 µm or less, 100 µm or less or 90 µm or less.

The average particle diameter (D) of the ball spacer of the present application may be adjusted considering a space between an upper substrate and a lower substrate of a transmittance variable device comprising the same afterward. For example, the average particle diameter (D) of the ball spacer may be from 1 µm to 15 µm, and, in another example, may be 2 µm or greater, 3 µm or greater, 4 µm or greater, 5 µm or greater, 6 µm or greater, 7 µm or greater or 8 µm or greater, or 15 µm or less, 14 µm or less, 13 µm or less, 12 µm or less, 11 µm or less, 10 µm or less or 9 µm or less.

In the pattern film provided in one embodiment of the present application, a standard deviation of the particle diameter of the ball spacer is 0.8 µm or less.

In another embodiment, the standard deviation of the particle diameter of the ball spacer may be 0.8 µm or less, preferably 0.7 µm or less, and more preferably 0.5 µm or less, and may be 0.05 µm or greater.

In the pattern film provided in one embodiment of the present application, optical density of the spacer pattern is 0.4 or greater and 4 or less.

The optical density may be obtained by measuring transmittance (unit: %) of the spacer pattern and then substituting the transmittance into an equation of optical density (optical density=−log 10(T), T is the transmittance). In another embodiment, the optical density of the spacer pattern may satisfy 0.4 or greater and 4.0 or less, preferably 0.5 or greater and 3.5 or less, and more preferably 1.0 or greater and 3.0 or less.

In the transmittance variable device capable of adjusting light transmittance, color or reflectivity, the area where the spacer pattern is present becomes an optically inactive area, and by the pattern film according to the present application satisfying the optical density range, light leakage may be controlled, and uniform optical performance may be secured when used in a transmittance variable device afterward by obtaining preparation stability of the spacer pattern. In other words, the optical density being less than the above-mentioned range may cause a problem of light leakage by passing through inside the spacer pattern, an optically inactive area, when driving the device, and the optical density being greater than the above-mentioned range may cause a problem of causing pattern preparation defects since UV curing of the polymer resin is inhibited by an increased content of black particles (carbon black or the like) achieving low transmittance (0.01%).

In one embodiment of the present application, as the first base layer, any base layer used in a substrate in a constitution of a known optical device such as a liquid crystal display (LCD) may be used. For example, the first base layer may be an inorganic base layer or an organic base layer. Examples of the inorganic base layer may comprise a glass base layer and the like, and examples of the organic base layer may comprise various plastic films and the like. Examples of the plastic film may comprise a TAC (triacetyl cellulose) film; a COP (cyclo olefin copolymer) film such as a norbornene derivative; an acrylic film such as PMMA (poly(methyl methacrylate); a PC (polycarbonate) film; a polyolefin film such as PE (polyethylene) or PP (polypropylene); a PVA (polyvinyl alcohol) film; a DAC (diacetyl cellulose) film; a Pac (polyacrylate) film; a PES (poly ether sulfone) film; a PEEK (polyetheretherketon) film; a PPS (polyphenylsulfone) film; a PEI (polyetherimide) film; a PEN (polyethylene naphthalate) film; a PET (polyethylene terephthalate) film; a PI (polyimide) film; a PSF (polysulfone) film; a PAR (polyarylate) film or the like, but are not limited thereto.

In one example, the first base layer may be a so-called flexible base layer. Specific types of the flexible base layer are not particularly limited, and among the base layers described above, mostly plastic films, or very thin inorganic bases such as thin glass may also be used as the flexible base layer.

A thickness of the first base layer is not particularly limited, and proper ranges may be selected depending on the application. Specifically, the thickness may satisfy a range of 1 µm or greater and 1,000 µm or less, preferably 10 µm or greater and 900 µm or less, and more preferably 30 µm or greater and 500 µm or less.

In one embodiment of the present application, another element required for driving a transmittance variable device may be further included between the first base layer and the spacer pattern. Various such elements are known, and typically, an electrode layer and the like are included.

In other words, in one embodiment of the present application, the pattern film may further comprise an electrode layer between the base layer and the spacer pattern.

As the electrode layer, known materials may be used. For example, the electrode layer may comprise a metal alloy, an electrically conductive compound, or a mixture of two or more types thereof. Examples thereof may comprise a metal such as gold, CuI, oxide materials such as ITO (indium tin oxide), IZO (indium zinc oxide), ZTO (zinc tin oxide), aluminum or indium doped zinc oxide, magnesium indium oxide, nickel tungsten oxide, ZnO, $SnO_2$ or $In_2O_3$, metal nitrides such as gallium nitride, metal selenides such as zinc selenide, metal sulfides such as zinc sulfide, and the like. A transparent hole injecting electrode layer may also be formed using a laminate of a metal thin film such as Au, Ag or Cu and a high refractive transparent material such as ZnS, $TiO_2$ or ITO, and the like.

The electrode layer may be formed using any means such as vapor deposition, sputtering, chemical vapor deposition or electrochemical means. The electrode layer may be patterned using known methods without particular limit, and for example, may be patterned through a known process using a photolithography, a shadow mask or the like.

One embodiment of the present application provides a transmittance variable device comprising the pattern film according to the present application; and a second substrate disposed opposite to the pattern film, wherein the first base layer of the pattern film and the second substrate are separated by a space, wherein the space is maintained by the spacer pattern of the pattern film.

Such a transmittance variable device may be used in various applications. Examples of the applications in which the transmittance variable device may be used comprise smart windows, window protective films, flexible display devices, active retarders or viewing angle adjustment films for displaying 3D images, openings in closed space comprising buildings, containers or vehicles such as windows or sunroofs, eyewear or the like, windows and doors, light shielding plates of organic light emitting devices (OLED), and the like. The scope of the eyewear may comprise all eyewear formed for an observer to observe the outside through a lens such as general glasses, sunglasses, sport goggles, or wearable devices such as helmets or devices for experiencing virtual reality or augmented reality.

In one example, the transmittance variable device itself may be a sunroof for a vehicle. For example, in a motor vehicle comprising a vehicle body in which at least one or more openings are formed, the transmittance variable device mounted on the opening or a sunroof for a vehicle may be mounted and used.

The sunroof is a fixed or moving (venting or sliding) opening present on a ceiling of a vehicle, and may collectively refer to a device capable of functioning to allow light or fresh air to flow into the vehicle. The operating method of the sunroof is not particularly limited in the present application, and, for example, may be manually operated or driven by a motor, and a shape, size or style of the sunroof may be properly selected depending on the targeted use. For example, examples of the sunroof may comprise, depending on the method of operation, a pop-up type sunroof, a spoiler (tile & slide) type sunroof, an in-built type sunroof, a folding type sunroof, a top-mount type sunroof, a panoramic roof system type sunroof, a removable roof panel (t-top or targa roof) type sunroof, a solar type sunroof or the like, but are not limited thereto.

The sunroof illustrated in the present application may comprise the transmittance variable device of the present application, and in this case, specific details on the transmittance variable device may be the same as the descriptions provided in the section of the transmittance variable device.

In the transmittance variable device provided in one embodiment of the present application, the second substrate comprises a second base layer; a transparent layer formed on the second base layer; and an adhesive layer provided on a surface of the transparent layer that is opposite to the surface that is in contact with the second base layer, and the adhesive layer is in contact with the spacer pattern side.

In addition, the transmittance variable device provided in one embodiment of the present application further comprises an alignment film provided so as to cover the spacer pattern of the pattern film.

The transmittance variable device provided in one embodiment of the present application further comprises a light modulation layer provided in the space that is maintained by the spacer pattern.

FIG. 3 illustrates a lamination structure of the transmittance variable device according to one embodiment of the present application.

Specifically, it may be identified that the transmittance variable device comprises a spacer pattern comprising a partition wall spacer (20) and a ball spacer (30) on a first base layer (10), and comprises an alignment film (40) formed so as to cover an upper portion of the spacer pattern, the transmittance variable device has a structure in which a second laminate formed with a second base layer (80)/a transparent layer (70)/an adhesive layer (60) with the adhesive layer being in contact with the spacer pattern side, and the transmittance variable device comprises a light modulation layer (50) provided in a space maintained by the spacer pattern.

The light modulation layer of the present application is a layer comprising at least a liquid crystal compound, and may mean a light modulation layer capable of controlling an alignment state of the liquid crystal compound through applying an external signal or the like. As the liquid crystal compound, all types of liquid crystal compounds may be used as long as the alignment direction changes by applying an external signal. Examples of the liquid crystal compound may comprise a nematic liquid crystal compound, a smectic liquid crystal compound, a cholesteric liquid crystal compound or the like. In addition, the liquid crystal compound may be a compound that does not have, for example, a polymerizable group or a crosslinkable group so that the alignment direction changes by applying an external signal.

The light modulation layer of the present application may further comprise a dichroic dye together with the liquid crystal compound. The term 'dye' in the present specification may mean a material capable of intensively absorbing and/or modifying light in at least a part of or the entire range in a visible region, for example, a wavelength range of 400 nm to 700 nm, and the term 'dichroic dye' may mean a material capable of anisotropic absorption of light in at least a part of or the entire range of the visible region. Examples of such a dye are known to comprise an azo dye, an anthraquinone dye or the like, but are not limited thereto.

In one example, the light modulation layer is a liquid crystal layer comprising a liquid crystal compound and a dichroic dye, and may be a so-called guest host liquid crystal layer (guest host liquid crystal cell). The term 'GHLC layer' may mean a functional layer in which a dichroic dye is arranged following the arrangement of liquid crystals, and thereby having anisotropic light absorption properties with respect to each of the arrangement direction of the dichroic dye and a direction perpendicular to the arrangement direction. For example, a dichroic dye is a material of which light absorption rate varies depending on the polarization direction, and may be referred to as a p-type dye when the absorption rate of light polarized in a major axis direction is high, and may be referred to as an n-type dye when the absorption rate of light polarized in a minor axis direction is high. In one example, when a p-type dye is used, polarized light vibrating in a major axis direction of the dye is absorbed, and polarized light vibrating in a minor axis direction of the dye may be transmitted since it is less absorbed. Hereinafter, the dichroic dye is assumed to be a p-type dye unless particularly mentioned otherwise.

The inventors of the present disclosure have identified that, by comprising a dichroic dye in the light modulation layer with a liquid crystal compound as above, light leakage during side observation that may occur in a transmittance variable device may be prevented. Alignment of a dichroic dye in a guest host liquid crystal layer follows alignment of a liquid crystal compound. Accordingly, for example, when the transmittance variable device is a device designed to obtain low transmittance when the liquid crystal compound is vertically aligned, the dichroic dye is also in a vertically aligned state or a state corresponding thereto in the vertically aligned state of the liquid crystal compound. Such a dichroic dye vertically aligned or aligned in a state corresponding thereto may absorb light to be leaked during side observation. Particularly, side light leakage may be prevented by introducing such a method without introducing a separate compensation structure, and side light leakage may be prevented without a complicated design even when the polymer film substrate is not an isotropic substrate.

Such an effect of preventing side light leakage by the dichroic dye may be further improved by the descriptions of the transmittance variable device of the present application. In other words, in the light modulation layer comprising the liquid crystal compound and the dichroic dye, alignment of the dichroic dye follows alignment of the liquid crystal compound, and herein, the alignment of the liquid crystal compound is determined by the types of the liquid crystal alignment film. The inventors of the present disclosure have identified that the alignment of the liquid crystal compound formed by an adhesive having vertical alignment force as to describe later is an alignment in which the dichroic dye following the alignment is capable of effectively blocking light to be leaked to the side. Accordingly, the effect of preventing side light leakage by the dichroic dye may be more maximized according to the descriptions of the present application to provide later.

The liquid crystal compound included in the light modulation layer may be present in a vertically aligned state in a state without applying an external action, that is, in an initial state or a normal state. The term external action in the present specification means all types of actions performed to change alignment or arrangement of the liquid crystal compound, and a representative example thereof comprises application of voltage. In the liquid crystal compound, the direction of arrangement of the liquid crystal compound in a vertically aligned state may be changed by an external action, and may return to the vertically aligned state again when the external action disappears.

In the application of the transmittance variable device, retardation (Rc) may be properly determined depending on the mode or structure to obtain. For example, a liquid crystal layer comprising the liquid crystal compound in a vertically aligned state may have in-plane retardation (Rin) calculated by the following Formula 1 of 30 nm or less, and thickness direction retardation (Rth) calculated by the following Formula 2 of 500 nm or greater in a state without applying an external action. Retardation in such a range is suitable to obtain, for example, a device in a normal transmission mode.

$$R_{in} = d \times (nx - ny) \quad \text{[Formula 1]}$$

$$R_{th} = d \times (nz - ny) \quad \text{[Formula 2]}$$

$R_{in}$ is in-plane retardation, $R_{th}$ is thickness direction retardation, d is a thickness of the light modulation layer, nx is a refractive index in an in-plane slow axis direction of the light modulation layer, ny is a refractive index in an in-plane fast axis direction of the light modulation layer, and nz is a refractive index in a thickness direction of the light modulation layer.

The transmittance variable device may exhibit a transparent mode in a state without applying an external action, and may be switched to various modes other than the transparent mode by an external action. Light transmittance of the transmittance variable device in a state without applying an external action may be properly adjusted depending on the application of the transmittance variable device within a range that does not impair purposes of the present application. A method of adjusting light transmittance of the transmittance variable device is not particularly limited, and may comprise a method of, for example, adjusting a content of a dichroic dye to describe later.

A dichroic dye included in the light modulation layer may have absorption in at least a visible region, for example, for wavelengths in a range of approximately 400 nm to 700 nm. When securing such absorption properties, the dichroic dye may be used as one type, or as a mixture of two or more types.

In one embodiment of the present application, types of the dichroic dye are not particularly limited, and for example, all types of known dyes may be used as long as they are aligned following the alignment of the liquid crystal compound while having the properties as above. As examples of the dichroic dye, a black dye or a color dye may be used.

A ratio of the dichroic dye included in the light modulation layer may be, for example, 5% by weight or less. The ratio of the dichroic dye is a ratio of the dichroic dye with respect to the weight of all components included in the light modulation layer. For example, when the light modulation layer comprises a liquid crystal compound, a dichroic dye and a chiral dopant, the percentage of the dichroic dye with respect to the total weight of the three components may be the ratio of the dichroic dye. When the ratio of the dichroic dye excessively increases, too much light may be absorbed at the front when the dichroic dye follows horizontal alignment of the liquid crystal compound, which is not an effect intended in the present application. In other words, the ratio of the dichroic dye needs to be properly controlled so that the dye minimally absorbs front light when following horizontal alignment of the liquid crystal compound while effectively preventing side light leakage when the dye follows vertical alignment of the liquid crystal compound. In another example, the ratio of the dichroic dye may be 4% by weight or less, 3% by weight or less, 2% by weight or less or 1% by weight, or 0.1% by weight or greater, 0.2% by weight or greater, 0.3% by weight or greater or 0.4% by weight or greater, but is not limited thereto.

By comprising the dichroic dye in the light modulation layer in the above-mentioned range, the present application is capable of providing a transmittance variable device having an excellent viewing angle compensation effect by controlling light leakage phenomenon on the side while exhibiting transmittance in a range to describe later in the transparent mode of the transmittance variable device.

The present application may relate to, for example, a transmittance variable device designed to have, by adjusting arrangement of the liquid crystal compound in the light modulation layer, vertical alignment as initial alignment, and have the vertically aligned state changing to a horizontally aligned state by applying an external signal. Herein, the initial alignment is an alignment state when no external signal is applied to the light modulation layer.

The term vertical alignment in the present specification may mean a state in which a director of the light modulation layer or a director of the liquid crystal compound in the light modulation layer is arranged roughly vertically with respect to the plane of the light modulation layer, and for example, an angle formed by the z axis, a normal of the reference plane of the light modulation layer, and the director may be in a range of approximately 80° to 100° or 85° to 95°, or approximately 90°. In addition, the term horizontal alignment may mean a state in which a director of the light modulation layer or a director of the liquid crystal compound in the light modulation layer is arranged roughly parallel with respect to the reference plane of the light modulation layer, and for example, an angle formed by the director and the reference plane of the light modulation layer may be in a range of approximately 0° to 10° or approximately 0° to 5°, or approximately 0°.

In the present specification, the term director of the light modulation layer or director of the liquid crystal compound may mean an optical axis or a slow axis of the light modulation layer. For example, the optical axis or the slow axis may mean a major axis direction when the liquid crystal molecule has a rod shape, and, when the liquid crystal molecule has a discotic shape, may mean an axis in the normal direction of the discotic plane. When a plurality of the liquid crystal compounds having different directors are included in the light modulation layer, the term director may mean a vector sum of the directors of the liquid crystal compound.

In one example, the light modulation layer may be designed to achieve a twist alignment mode. The team twist alignment mode in the present specification may mean a spiral structure in which the directors of the liquid crystal compounds are aligned while being twisted along an imaginary spiral axis to form a layer. The twist alignment mode may be achieved in the vertical or horizontal alignment mode described above. For example, the vertical twist alignment mode may mean a state in which individual liquid crystal compounds are twisted along a spiral axis in a vertically aligned state to form a layer, and the horizontal twist alignment mode may mean a state in which individual liquid crystal compounds are twisted along a spiral axis in a horizontally aligned state to form a layer.

In the twist alignment mode, the thickness (d) of the light modulation layer and the pitch (p) may have a ratio (d/p) of, for example, 1 or less. When the ratio (d/p) is greater than 1, problems such as finger domain may occur, and therefore, the ratio may be adjusted to the above-mentioned range as possible. In another example, the ratio (d/p) may also be approximately 0.95 or less, approximately 0.9 or less, approximately 0.85 or less, approximately 0.8 or less, approximately 0.75 or less, approximately 0.7 or less, approximately 0.65 or less, approximately 0.6 or less, approximately 0.55 or less, approximately 0.5 or less or approximately 0.45 or less, or approximately 0.1 or greater, approximately 1.15 or greater, approximately 0.2 or greater, approximately 0.25 or greater, approximately 0.3 or greater or approximately 0.35 or greater. Herein, the thickness (d) of the light modulation layer may have the same meaning as a cell gap in the transmittance variable device.

The pitch (p) of the light modulation layer in the twist alignment mode may be measured using a measurement method using a wedge cell, and specifically, a method described in Simple method for accurate measurements of the cholesteric pitch using a stripe-wedge Grandjean-Cano cell (Liquid Crystals, Vol. 35, No. 7, July 8\2008, 789-791) by D.Podolskyy et. al. may be used.

The alignment of the liquid crystal compound formed by the ratio of the thickness (d) and the pitch (p) as above may effectively absorb light to be leaked on the side when the alignment of the dichroic dye following the same is vertically aligned, and may minimize absorption of front light when horizontally aligned.

The light modulation layer may further comprise a so-called chiral dopant so as to achieve a twist mode. In other words, the light modulation layer may further comprise a chiral dopant together with the liquid crystal compound and the dichroic dye.

The chiral dopant that may be included in the light modulation layer is not particularly limited as long as it induces target twisting without impairing liquid crystal properties such as nematic regularity. The chiral dopant for inducing rotation of the liquid crystal molecule needs to at least comprise chirality in the molecular structure. Examples of the chiral dopant may comprise compounds having one, two or more asymmetric carbons, compounds having an asymmetric point on a heteroatom such as chiral amine or chiral sulfoxide, or compounds having an axially asymmetric, optically active site such as cumulene or binaphthol. The chiral dopant may be, for example, a low molecular compound having a molecular weight of 1,500 or less. As the chiral dopant, commercially available chiral nematic liquid crystals such as chiral dopant liquid crystal 5811 of Merck, LC756 of BASF, or the like may be used.

The application ratio of the chiral dopant is not particularly limited as long as the target ratio (d/p) is achieved. The content (% by weight) of the chiral dopant is generally calculated by a formula of 100/(HTP (helical twisting power)xpitch (nm)), and a proper ratio may be selected considering the target pitch (p).

The light modulation layer may comprise a liquid crystal compound having negative dielectric anisotropy, or the light modulation layer may have the above-mentioned dielectric anisotropy. An absolute value of the dielectric anisotropy may be properly selected considering purposes of the present application. The term 'dielectric anisotropy ($\Delta\lambda$)' may mean a difference ($\varepsilon// - \varepsilon\perp$) between a horizontal dielectric constant ($\varepsilon//$) and a vertical dielectric constant ($\varepsilon\perp$). The term horizontal dielectric constant ($\varepsilon//$) in the present specification means a dielectric constant value measured, while applying a voltage so that the director of the liquid crystal molecule and the direction of an electric field by the applied voltage are substantially horizontal, along the direction of the electric field, and the vertical dielectric constant ($\varepsilon\perp$) means a dielectric constant value measured, while applying a voltage so that the director of the liquid crystal molecule and the direction of an electric field by the applied voltage are substantially vertical, along the direction of the electric field.

The liquid crystal layer may comprise a liquid crystal compound having refractive index anisotropy (n$\Delta$) in a range of approximately 0.04 to 0.15, or the liquid crystal layer may have the above-mentioned refractive index anisotropy. The refractive index anisotropy (n$\Delta$) referred to in the present application is a difference (ne-no) between an extraordinary refractive index (ne) and an ordinary refractive index (no), which may be identified using an Abbe refractometer, and the specific method follows a method disclosed in the following example. In another example, the refractive index anisotropy (n$\Delta$) may be approximately 0.14 or less, 0.13 or less, 0.12 or less, 0.11 or less or 0.1 or less, or 0.05 or greater, 0.06 or greater, 0.07 or greater, 0.08 or greater or 0.09 or greater.

A thickness of the light modulation layer of the present application may be properly selected considering purposes of the present application. In one example, the light modulation layer may have a thickness of approximately 15 μm or less. By controlling the thickness as above, a device having a large transmittance difference in the transparent mode and the blocking mode, that is, a device having excellent transmittance variable properties, may be obtained. In another example, the thickness may be approximately 14 μm or less, 13 μm or less, 12 μm or less, 11 μm or less, 10 μm or less, 9 μm or less or 8 μm or less, or 1 μm or greater, 2 μm or greater, 3 μm or greater, 4 μm or greater, 5 μm or greater, 6 μm or greater, 7 μm or greater or 8 μm or greater, but is not limited thereto.

In one embodiment of the present application, the transparent layer may be a transparent conductive layer, and the transparent conductive layer may be formed by depositing a conductive polymer, a conductive metal, a conductive nanowire or a metal oxide such as ITO (indium tin oxide), or the like. Various materials and forming methods that may form the transparent conductive layer are known in addition thereto, and these may be used without limit.

In the transmittance variable device provided in one embodiment of the present application, the adhesive layer comprises an adhesive having vertical alignment force.

The term 'adhesive having vertical alignment force' in the present specification may mean a layer comprising a vertically aligning adhesive having adhesive strength capable of adhering the first laminate and the second laminate while providing vertical alignment force for materials present in the light modulation layer.

The term adhesive layer having vertical alignment force in the present specification may mean a material having both vertical alignment force for the liquid crystal molecule and adhesive strength.

As the adhesive layer having vertical alignment force in the present application, a silicone adhesive may be used, for example. As the silicone adhesive, a cured material of a composition comprising a curable silicone compound may be used. Types of the curable silicone compound are not particularly limited, and for example, heat curable silicone compounds or UV curable silicone compounds may be used.

In one example of the present application, the curable silicone compound is an addition-curable silicone compound, and may comprise (1) an organopolysiloxane containing two or more alkenyl groups in the molecule and (2) an organopolysiloxane containing two or more silicon-bonding hydrogen atoms in the molecule. Such a silicone compound may form a cured material using, for example, an addition reaction under the presence of a catalyst to describe later.

The (1) organopolysiloxane is a main component forming the silicone cured material, and may comprise at least two alkenyl groups in one molecule. Herein, specific examples of the alkenyl group may comprise a vinyl group, an allyl group, a butenyl group, a pentenyl group, a hexenyl group, a heptenyl group or the like, and although a vinyl group may be preferred among these, the alkenyl group is not limited thereto. In the (1) organopolysiloxane, a bonding position of the alkenyl group described above is not particularly limited. For example, the alkenyl group may bond to an end of the molecular chain and/or a side chain of the molecular chain. In addition, in the (1) organopolysiloxane, types of substituents that may be included other than the alkenyl described above may comprise an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like, and although a methyl group or a phenyl group is preferred among these, the substituent is not limited thereto.

A molecular structure of the (1) organopolysiloxane is not particularly limited, and may have any shape such as a linear shape, a branched shape, a cyclic shape, a net shape, or a linear shape having a part forming a branched shape. In the present application, having a linear shape molecular structure is particularly preferred among the molecular structures as above, however, the molecular structure is not limited thereto. Meanwhile, from the viewpoint of hardness of the cured material and the refractive index, using an organopolysiloxane containing an aromatic group such as an aryl group or an aralkyl group in the molecular structure is preferred as the (1) organopolysiloxane in the present disclosure, however, the (1) organopolysiloxane is not limited thereto.

More specific examples of the (1) organopolysiloxane that may be used in the present application may comprise a branched both end trimethylsiloxane group-blocked dimethylsiloxane-methylvinylsiloxane copolymer, branched both end trimethylsiloxane group-blocked methylvinylpolysiloxane, a branched both end trimethylsiloxane group-blocked dimethylsiloxane-methylvinylsiloxane-methylphenylsiloxane copolymer, branched both end dimethylvinylsiloxane group-blocked dimethylpolysiloxane, branched both end dimethylvinylsiloxane group-blocked methyl vinylpolysiloxane, a branched both end dimethylvinylsiloxane group-blocked dimethylsiloxane-methylvinylsiloxane copolymer, a branched both end dimethylvinylsiloxane group-blocked dimethylsiloxane-methylvinylsiloxane-methylphenylsiloxane copolymer, an organopolysiloxane copolymer comprising a siloxane unit represented by $R^1_2SiO_{1/2}$, a siloxane unit represented by $R^1_2R^2SiO_{1/2}$ and a siloxane unit represented by $SiO_{4/2}$, an organopolysiloxane copolymer comprising a siloxane unit represented by $R^1_2R^2SiO_{1/2}$ and a siloxane unit represented by $SiO_{4/2}$ an organopolysiloxane copolymer comprising a siloxane unit represented by $R^1R^2SiO_{2/2}$ and a siloxane unit represented by $R^1SiO_{3/2}$ or a siloxane unit represented by $R^2SiO_{3/2}$, and a mixture of two or more thereof, but are not limited thereto. In the above, $R^1$ is a hydrocarbon group other than the alkenyl group, and specific examples thereof may comprise an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like. In addition, $R^2$ is an alkenyl group, and specific examples thereof may comprise a vinyl group, an allyl group, a butenyl group, a pentenyl group, a hexenyl group, a heptenyl group or the like.

In one aspect of the present disclosure, the (1) organopolysiloxane may have viscosity of 50 CP to 500,000 CP (centipoise), and preferably 400 CP to 100,000 CP at 25° C. When the viscosity is less than 50 CP, mechanical strength of the cured material of the silicone compound may decrease, and when the viscosity is greater than 500,000 CP, handling properties or workability may decline.

In the addition-curable silicone compound, the (2) organopolysiloxane may perform a role of crosslinking the (1)

organopolysiloxane. In the (2) organopolysiloxane, a bonding position of the hydrogen atom is not particularly limited, and, for example, may bond to an end and/or side chain of the molecular chain. In addition, in the (2) organopolysiloxane, types of substituents that may be included other than the silicon-bonding hydrogen atom are not particularly limited, and may comprise, for example, an alkyl group, an aryl group, an aralkyl group, a halogen-substituted alkyl group or the like as described in the (1) organopolysiloxane, and although a methyl group or a phenyl group is preferred among these, the substituent is not limited thereto.

Meanwhile, a molecular structure of the (2) organopolysiloxane is not particularly limited, and may have any shape such as a linear shape, a branched shape, a cyclic shape, a net shape, or a linear shape having a part forming a branched shape. In the present application, having a linear shape molecular structure is particularly preferred among the molecular structures as above, however, the molecular structure is not limited thereto.

More specific examples of the (2) organopolysiloxane that may be used in the present disclosure may comprise branched both end trimethylsiloxane group-blocked methylhydrogenpolysiloxane, a branched both end trimethylsiloxane group-blocked dimethylsiloxane-methylhydrogen copolymer, a branched both end trimethylsiloxane group-blocked dimethylsiloxane-methylhydrogensiloxane-methylphenylsiloxane copolymer, branched both end dimethylhydrogensiloxane group-blocked dimethylpolysiloxane, a branched both end dimethylhydrogensiloxane group-blocked dimethylsiloxane-methylphenylsiloxane copolymer, branched both end dimethylhydrogensiloxane group-blocked methylphenylpolysiloxane, an organopolysiloxane copolymer comprising a siloxane unit represented by $R^1_3SiO_{1/2}$, a siloxane unit represented by $R^1_2HSiO_{1/2}$ and a siloxane unit represented by $SiO_{4/2}$, an organopolysiloxane copolymer comprising a siloxane unit represented by $R^1_2HSiO_{1/2}$ and a siloxane unit represented by $SiO_{4/2}$, an organopolysiloxane copolymer comprising a siloxane unit represented by $R^1HSiO_{2/2}$ and a siloxane unit represented by $R^1SiO_{3/2}$ or a siloxane unit represented by $HSiO_{3/2}$, and a mixture of two or more thereof, but are not limited thereto. In the above, $R^1$ is a hydrocarbon group other than the alkenyl group, and specific examples thereof may comprise an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like.

In the present application, the (2) organopolysiloxane may have viscosity of, for example, 1 CP to 500,000 CP (centipoise), and preferably 5 CP to 100,000 CP at 25° C. When the viscosity is less than 1 CP, mechanical strength of the cured material of the silicone compound may decrease, and when the viscosity is greater than 500,000 CP, handling properties or workability may decline.

In the present application, a content of the (2) organopolysiloxane is not particularly limited as long as it is included to an extent of achieving proper curing. For example, the (2) organopolysiloxane may be included in an amount of 0.5 to 10 silicon-bonding hydrogen atoms with respect to one alkenyl group included in the (1) organopolysiloxane described above. When the number of the silicon-bonding hydrogen atoms is less than 0.5, the curable silicone compound may be insufficiently cured, and when the number is greater than 10, heat resistance of the cured material may decrease. Meanwhile, from the viewpoint of hardness of the cured material and the refractive index, using an (2) organopolysiloxane containing an aromatic group such as an aryl group or an aralkyl group in the molecular structure is preferred as the (2) organopolysiloxane in the present disclosure, however, the (2) organopolysiloxane is not limited thereto.

In the present application, the addition-curable silicone compound may further comprise platinum or a platinum compound as a catalyst for curing. Specific examples of such platinum or a platinum compound may comprise platinum fine powder, platinum black, platinum-supported silica fine powder, platinum-supported activated carbon, chlorinated platinum acid, platinum tetrachloride, an alcohol solution of chlorinated platinum acid, a complex of platinum and olefin, a complex of platinum and alkenylsiloxane such as 1,1,3,3-tetramethyl-1,3-divinyldisiloxane, thermoplastic resin fine powder (polystyrene resin, nylon resin, polycarbonate resin, silicone resin and the like) having a particle diameter of less than 10 μm containing these platinum or platinum compounds, but are not limited thereto.

A content of the catalyst described above in the addition-curable silicone compound of the present disclosure is not particularly limited, and may be, for example, an amount of 0.1 ppm to 500 ppm, and preferably 1 ppm to 50 ppm as a weight unit in the whole compound. When the catalyst content is less than 0.1 ppm, curability of the composition may decline, and when the content is greater than 500 ppm, economic feasibility may decrease.

In the present application, the addition-curable silicone compound may further comprise a curing inhibitor such as an alkyne alcohol such as 3-methyl-1-butyn-3-ol, 3,5-dimethyl-1-hexyn-3-ol or phenylbutynol; an enyne compound such as 3-methyl-3-penten-1-yne or 3,5-dimethyl-3-hexen-1-yne; 1,2,5,7-tetramethyl-1,3,5,7-tetravinylcyclotetrasiloxane, 1,3,5,7-tetramethyl-1,3,5,7-tetrahexenylcyclotetrasiloxane or benzotriazole in terms of enhancing the storage stability, the handing properties and the workability. A content of the curing inhibitor may be properly selected in a range that does not impair purposes of the present disclosure, and for example, may be in a range of 10 ppm to 50,000 ppm based on the weight.

In the present application, the silicone compound is a condensation-curable silicone compound, and may comprise, for example, (a) an alkoxy group-containing siloxane polymer; and (b) a hydroxyl group-containing siloxane polymer.

The (a) siloxane polymer that may be used in the present disclosure may be, for example, a compound represented by the following Chemical Formula 1.

 [Chemical Formula 1]

In the formula, R1 and R2 each independently represent a hydrogen atom or a substituted or unsubstituted monovalent hydrocarbon group, R3 represents an alkyl group, and when a plurality of each of R1, R2 and R3 are present, they may be the same as or different from each other, a and b each independently represent a number of 0 or greater and less than 1, a+b represents a number of greater than 0 and less than 2, c represents a number of greater than 0 and less than 2, d represents a number of greater than 0 and less than 4, and (a+b+c)x2+d is 4.

In the present disclosure, the siloxane polymer represented by Chemical Formula 1 may have a polystyrene-converted weight average molecular weight of 1,000 to 100,000, preferably 1,000 to 80,000, and more preferably 1,500 to 70,000 when measured by gel permeation chromatography. When the (a) siloxane polymer has a weight average molecular weight in the above-mentioned range, a favorable cured material may be obtained without causing defects such as cracks during the formation of the silicone cured material.

In the definition of Chemical Formula 1, examples of the monovalent hydrocarbon may comprise an alkyl group having 1 to 8 carbon atoms, a phenyl group, a benzyl group, a tolyl group or the like, and examples of the alkyl group having 1 to 8 carbon atoms herein may comprise a methyl group, an ethyl group, a propyl group, an isopropyl group, a butyl group, a pentyl group, a hexyl group, a heptyl group, an octyl group or the like. In addition, in the definition of Chemical Formula 1, the monovalent hydrocarbon group may be substituted with known substituents such as, for example, halogen, an amino group, a mercapto group, an isocyanate group, a glycidyl group, a glycidoxy group or an ureido group. In addition, in the definition of Chemical Formula 1, examples of the alkyl group of R3 may comprise a methyl group, an ethyl group, a propyl group, an isopropyl group, a butyl group or the like. In such an alkyl group, a methyl group, an ethyl group or the like is preferred, however, the alkyl group is not limited thereto.

In the present disclosure, using a branched or tertiary crosslinked siloxane polymer is preferred among the polymers of Chemical Formula 1. In addition, in the (a) siloxane polymer, a hydroxyl group may remain within a range that does not impair purposes of the present disclosure, specifically, a range that does not inhibit the dealcoholization reaction.

Such a (a) siloxane polymer may be prepared by, for example, hydrolyzing and condensing a multifunctional alkoxysilane, a multifunctional chlorosilane or the like. Those skilled in the art may readily select a proper multifunctional alkoxysilane or chlorosilane depending on the target (a) siloxane polymer, and conditions of the hydrolysis and condensation reactions using the same may be readily controlled as well. Meanwhile, when preparing the (a) siloxane polymer, a proper monofunctional alkoxysilane may be used in combination depending on the purpose.

Examples of such a (a) siloxane polymer may comprise commercially available organosiloxane polymers such as X40-9220 or X40-9225 of Shin-Etsu Silicone, XR31-B1410, XR31-B0270 or XR31-B2733 of GE Toray Silicone. Meanwhile, from the viewpoint of hardness of the cured material and the refractive index, using an (a) organopolysiloxane containing an aromatic group such as an aryl group or an aralkyl group in the molecular structure is preferred as the (a) organopolysiloxane in the present disclosure, however, the (a) organopolysiloxane is not limited thereto. Meanwhile, as the (b) hydroxyl group-containing siloxane polymer included in the condensation-curable silicone compound, a compound represented by the following Chemical Formula 2 may be used, for example.

[Chemical Formula 2]

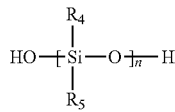

In Chemical Formula 2, R4 and R5 each independently represent hydrogen; or a substituted or unsubstituted monovalent hydrocarbon group, and when a plurality of each of R4 and R5 are present, they may be the same as or different from each other, and n represents an integer of 5 to 2,000.

In the definition of Chemical Formula 2, specific types of the monovalent hydrocarbon group may comprise, for example, the same hydrocarbon group as in Chemical Formula 1 described above.

In the present disclosure, the siloxane polymer of Chemical Formula 2 may have a polystyrene-converted weight average molecular weight of 500 to 100,000, preferably 1,000 to 80,000, and more preferably 1,500 to 70,000 when measured by a gel permeation chromatography. When the (b) siloxane polymer has a weight average molecular weight in the above-mentioned range, a favorable cured material may be obtained without causing defects such as cracks during the formation of the silicone cured material.

Such a (b) siloxane polymer may be prepared by, for example, hydrolyzing and condensing a dialkoxysilane, a dichlorosilane and/or the like. Those skilled in the art may readily select a proper dialkoxysilane or dichlorosilane depending on the target (b) siloxane polymer, and conditions of the hydrolysis and condensation reactions using the same may be readily controlled as well. Examples of such a (b) siloxane polymer may comprise commercially available difunctional organosiloxane polymers such as XC96-723, YF-3800, YF-3804 or the like of GE Toray Silicone. Meanwhile, from the viewpoint of hardness of the cured material and the refractive index, using an (1) organopolysiloxane containing an aromatic group such as an aryl group or an aralkyl group in the molecular structure is preferred as the (1) organopolysiloxane in the present disclosure, however, the (1) organopolysiloxane is not limited thereto.

Types of the adhesive layer having vertical alignment force are not particularly limited and may be properly selected depending on the target application, and for example, a solid adhesive, a semi-solid adhesive, an elastic adhesive or a liquid adhesive may be properly selected and used. The solid adhesive, the semi-solid adhesive or the elastic adhesive may be referred to as a so-called pressure sensitive adhesive (PSA), and may be cured before bonding a subject to adhere. The liquid adhesive may be referred to as a so-called optical clear resin (OCR), and may be cured after bonding a subject to adhere. As the PSA-type adhesive having vertical alignment force in the present application, a polydimethylsiloxane adhesive or a polymethylvinylsiloxane adhesive may be used as an example, and as the OCR-type adhesive having vertical alignment force, an alkoxysilicone adhesive may be used, however, the PSA-type adhesive and the OCR-type adhesive are not limited thereto.

By comprising the adhesive layer having such properties under such a disposition, a transmittance variable device capable of exhibiting superior optical properties by controlling light leakage particularly in a blocking mode while having superior adhesive strength may be provided.

In one embodiment of the present application, the adhesive having vertical alignment force may comprise functional nanoparticles.

The term 'functional nanoparticles' means nano-dimension particles having a function of changing electrical properties of the adhesive layer having vertical alignment force such as providing electrical conductivity properties or a fixed dielectric constant value to the adhesive layer having vertical alignment force.

In addition, the effect of reducing a driving voltage of the transmittance variable device may ultimately vary depending on the inclusion of the functional nanoparticles and a content range thereof.

In one example, the adhesive layer having vertical alignment force may comprise the functional nanoparticles in a ratio of 0.005% by weight to 60% by weight. In a specific example, the adhesive layer having vertical alignment force may comprise the functional nanoparticles in a ratio of 0.05% by weight to 50% by weight or 0.1% by weight to 40% by weight. In the above-mentioned range, target properties of reducing a driving voltage may be secured.

Types of the functional nanoparticles are not particularly limited as long as they are capable of providing properties of reducing a driving voltage to a display device while satisfying the above-described definition, however, conductive nanoparticles, dielectric nanoparticles or the like may be included, for example.

In the present application, the term 'conductive particles' means particles exhibiting a fixed electrical conductivity as particles allowing to pass electricity. The conductive particles are referred to as particles for convenience, however, the shape is not particularly limited.

The conductive particles are for providing fixed electrical conductivity to the adhesive layer having vertical alignment force, and may have electrical conductivity of $1.0 \times 10^1$ S/m or greater. In another example, the electrical conductivity may be $1.0 \times 10^2$ S/m or greater, $1.0 \times 10^3$ S/m or greater, $1.0 \times 10^4$ S/m or greater or $1.0 \times 10^5$ S/m or greater. When considering a purposes of providing high electrical conductivity to the adhesive layer having vertical alignment force, an upper limit value of the electrical conductivity of the conductive particles is not particularly limited, but may be, for example, $1.0 \times 10^{12}$ S/m or less.

In the present application, the term 'dielectric particles' means particles having a fixed dielectric constant as a material having a function of retaining electricity. The dielectric particles are referred to as particles for convenience, however, the shape is not particularly limited.

The shape of the functional nanoparticles may be a tube, wire, rod or ring shape as well as a particle shape.

In one example, the functional nanoparticles may have a spherical nanoparticle, nanotube, nanowire, nanorod or nanoring shape. The term 'nanoring' may mean, as nanoparticles having a spherical shape, a nanostructure having an overall ring shape by comprising a hollow portion.

In one example, the functional nanoparticles may be spherical nanoparticles.

Specifically, as the functional nanoparticles, ITO nanoparticles, Ag nanowire, silica nanoparticles or the like may be included as an example, however, the functional nanoparticles are not limited thereto.

In the present application, among the functional particles described above, those having proper compatibility with materials included in the adhesive layer described above and thereby having properties capable of being uniformly dispersed in the vertically aligned adhesive layer may be properly selected, and included in the vertically aligned adhesive layer.

By comprising the functional nanoparticles described above in a fixed content range, the vertically aligned adhesive layer of the present application may provide electrical conductivity properties or a fixed dielectric constant value to the vertically aligned adhesive layer. Specifically, depending on the inclusion of the functional nanoparticles, the vertically aligned adhesive layer may have a fixed difference in the electrical conductivity or difference in the dielectric constant.

In one example, the vertically aligned adhesive layer may comprise the functional nanoparticles so as to satisfy the following Mathematical Equation 1.

$$G_i \times 100 \leq G_N \leq 1 \times 10^{10} \text{ S/m} \quad \text{[Mathematical Equation 1]}$$

In Mathematical Equation 1, $G_N$ represents an electrical conductivity value (S/m) of the adhesive layer having vertical alignment force comprising the functional nanoparticles, and $G_i$ represents an electrical conductivity value (S/m) of the adhesive layer having vertical alignment force without comprising the functional nanoparticles.

When comprising the adhesive layer having vertical alignment force and satisfying Mathematical Equation 1 in the transmittance variable device, application of an electric field may be effectively induced to the light modulation layer, which leads to the effect of substantially reducing a cell gap difference, and ultimately, the effect of lowering a driving voltage of the transmittance variable device may be achieved.

Specifically, the electrical conductivity value that may be achieved by comprising the functional particles having fixed electrical conductivity in the adhesive layer having vertical alignment force may be 100 times or greater, 110 times or greater, 120 times or greater, 130 times or greater, 140 times or greater or 150 times or greater compared to the electrical conductivity value that may be achieved when the adhesive layer having vertical alignment force does not comprise the functional particles. In the above-mentioned range, an electric field may be applied to the light modulation layer, and the target effect of reducing a driving voltage may be obtained.

More specifically, the adhesive layer having vertical alignment force may have an electrical conductivity value of, for example, $1.0 \times 10^{-5}$ S/m or greater. In such an electrical conductivity range, a relatively low resistance value is obtained compared to the light modulation layer, and an electric field may be applied to an intermediate layer. In another example, the adhesive layer may have electrical conductivity of $2.0 \times 10^{-5}$ S/m or greater or $2.1 \times 10^{-5}$ S/m or greater. An upper limit of the electrical conductivity value is not particularly limited, and may be, for example, $1 \times 10^{10}$ S/m or less.

In another example, the adhesive layer having vertical alignment force may comprise the functional nanoparticles so as to satisfy the following Mathematical Equation 2.

$$C_i \times 1.5 \leq C_N \leq 50 \quad \text{[Mathematical Equation 2]}$$

In Mathematical Equation 2, $C_N$ represents a dielectric constant value of the adhesive layer having vertical alignment force comprising the functional nanoparticles, and $C_i$ represents a dielectric constant value of the adhesive layer having vertical alignment force without comprising the functional nanoparticles.

In other words, the dielectric constant value that may be achieved by comprising the functional particles in a fixed content in the adhesive layer having vertical alignment force may be 1.5 times or greater, 1.6 times or greater, 1.7 times or greater, 1.8 times or greater, 1.9 times or greater or 2 times or greater compared to the dielectric constant value that may be achieved when the adhesive layer having vertical alignment force does not comprise the functional particles. In the above-mentioned range, an electric field may be applied to the light modulation layer, and the target driving voltage effect may be obtained.

Specifically, the adhesive layer having vertical alignment force may have a dielectric constant value of, for example, 3.00 or greater. In such a dielectric constant range, a relatively low resistance value is obtained compared to the light modulation layer, and an electric field may be applied to an intermediate layer. In another example, the adhesive layer having vertical alignment force may have a dielectric constant of 3.50 or 3.70 or greater. An upper limit of the dielectric constant value is not particularly limited, and may be, for example, 50 or less.

When the adhesive layer having vertical alignment force comprises the functional nanoparticles so as to satisfy Mathematical Equation 1 or Mathematical Equation 2 described above, target properties of reducing a driving voltage of the transmittance variable device may be secured.

In one embodiment of the present application, descriptions on the second base layer may be the same as the descriptions on the first base layer provided above.

In one embodiment of the present application, the alignment film may be used to determine initial alignment of the liquid crystals in the light modulation layer. Herein, types of the alignment film used herein are not particularly limited, and may be, for example, a known rubbing alignment film or a light alignment film.

The alignment direction may be a rubbing direction in the rubbing alignment film, and a direction of irradiated polarized light in the light alignment film, and such an alignment direction may be identified using a detection method using a linear polarization layer. For example, in the light modulation layer of the present application having a twist alignment mode such as a TN (twisted nematic) mode, when disposing a linear polarization layer on one surface and measuring transmittance while changing an absorption axis of the polarization layer, the transmittance tends to be low when the absorption axis or the transmission axis and the alignment direction of the alignment film are identical, and the alignment direction may be identified through a simulation reflecting refractive index anisotropy or the like of the used liquid crystal compound. A method of identifying the alignment direction depending on the mode of the light modulation layer of the present application is known.

One embodiment of the present application provides a method for manufacturing a transmittance variable device, the method comprising preparing the pattern film according to the present application; forming a first laminate by forming an alignment film on the spacer pattern-formed first base layer of the pattern film so as to cover the spacer pattern; forming a second laminate by forming an adhesive layer on a laminate of a second base layer and a transparent layer; laminating the first laminate and the second laminate so that the adhesive layer of the second laminate is in contact with the spacer pattern side of the first laminate; and forming a light modulation layer between the first laminate and the second laminate.

Through such a manufacturing method, the transmittance variable film according to the present application may have a specific lamination structure.

Hereinafter, the present specification will be described in more detail with reference to examples. However, the following examples are for illustrative purposes only, and not to limit the present specification.

PREPARATION EXAMPLE

Example 1

A curable composition used for forming a partition wall spacer was prepared in the following manner.

A black ball spacer and a darkening material were mixed to a binder commonly used in partition wall spacer preparation as a binder comprising a UV curable acrylate compound, a polymerization initiator and a dispersant to prepare a curable composition. Herein, as the black ball spacer, a black ball spacer (manufacturer: Sekisui Chemical, product name: KBN 508) having an average particle diameter of approximately 8 µm, a CV (coefficient of variation) of 4, and a standard deviation of the particle diameter of approximately 0.32 µm was used. The black ball spacer was mixed in 2.5 parts by weight with respect to 100 parts by weight of the binder. In addition, as the darkening material, carbon black was mixed in a ratio of approximately 3% by weight in the material. The prepared composition was identified to have optical density (OD) of approximately 1.36.

To a monoaxially elongated base film (PET, poly(ethylene terephthalate)) having a non-crystalline ITO (indium tin oxide) electrode layer formed on the surface, 2 mL to 3 mL of the curable composition prepared above was dropped on the electrode layer, and the dropped mixture was compressed using a mask to form a laminate comprising the base layer, the electrode layer, the curable composition layer and the mask, and ultraviolet light was irradiated toward the mask to cure the curable composition layer. (Irradiation dosage: 320 mJ/cm$^2$)

As the mask used, a mask having a shape in which a patterned light shielding layer (AgX, X=Cl, F, Br or I) and a release layer are consecutively formed on a PET film, a transparent base film, was used as illustrated in FIG. 6. Herein, the light shielding layer pattern has a tetragonal arrangement rule. For example, a state of disposing 100 dots on a base layer having a total area of approximately 10 mm each with a constant space (normal pitch) of 250 µm was assumed (state of normal disposition). Herein, a cross-sectional area of the bottom of the individual dot was adjusted to approximately 10 µm. Then, the individual dots were connected by a line to form a tetragonally arranged partition wall spacer pattern (mesh pattern) having a line width of approximately 10 µm.

After irradiating ultraviolet light, the uncured curable composition was removed (developed) to form a partition wall spacer. FIG. 1 is a cross-sectional diagram of the spacer pattern-formed pattern film manufactured as above. As in FIG. 1, the partition wall spacer forms a spacer pattern in a form of the black ball spacer being embedded, partially embedded or in contact. The prepared partition wall spacer had a height of approximately 8.2 µm to 8.4 µm with an average of approximately 8.3 µm, and the line width was measured to be approximately 15 µm to 21 µm with an average of approximately 17.6 µm.

In addition, the ratio of the area having the tetragonally arranged partition wall spacer pattern (mesh pattern) present on the first base layer surface was approximately 13.6%. Herein, a standard deviation of the height of the spacer pattern was approximately 0.1 µm, and a standard deviation of the diameter of the ball spacer was approximately 0.95 µm.

FIGS. 7A to 7B are diagrams showing an optical microscope image of 50 magnifications (FIG. 7A) and an optical microscope image of 200 magnifications (FIG. 7B) for the pattern film according to Example 1 of the present application, and the result of diffraction evaluation thereon. Specifically, comprising a regular rectangular-shaped spacer pattern comprising the ball spacer and the partition wall spacer was identified from the results of the optical microscope images, and manufacturing without an overcuring phenomenon that may form around the spacer pattern or disconnection of the pattern was identified.

Example 2

A pattern film was formed in the same manner as in Example 1 except that the mask design (light shielding layer pattern pitch 350 µm) was changed.

The prepared partition wall spacer had a height of approximately 8.2 μm to 8.4 μm with an average of approximately 8.3 μm, and the line width was measured to be approximately 14 μm to 18 μm with an average of approximately 16.1 μm.

In addition, the ratio of the area having the tetragonally arranged partition wall spacer pattern (mesh pattern) present on the first base layer surface was approximately 9%. Herein, a standard deviation of the height of the spacer pattern was approximately 0.1 μm, and a standard deviation of the diameter of the ball spacer was approximately 0.7 μm.

FIGS. 8A to 8B are diagrams showing an optical microscope image of 50 magnifications (FIG. 8A) and an optical microscope image of 200 magnifications (FIG. 8B) for the pattern film according to Example 2 of the present application, and the result of diffraction evaluation thereon. Specifically, comprising a regular rectangular-shaped spacer pattern comprising the ball spacer and the partition wall spacer was identified from the results of the optical microscope images, and manufacturing without an overcuring phenomenon that may form around the spacer pattern or disconnection of the pattern was identified.

Comparative Example 1

A pattern film was formed in the same manner as in Example 1 except that the mask design (light shielding layer pattern line width 13 μm) was changed.

The prepared partition wall spacer had a height of approximately 8.2 μm to 8.4 μm with an average of approximately 8.3 μm, and the line width was measured to be approximately 20 μm to 25 μm with an average of approximately 22.4 μm.

In addition, the ratio of the area having the tetragonally arranged partition wall spacer pattern (mesh pattern) present on the first base layer surface was approximately 17.1%. Herein, a standard deviation of the height of the spacer pattern was approximately 0.1 μm, and a standard deviation of the diameter of the ball spacer was approximately 1.0 μm.

FIGS. 9A to 9B are diagrams showing an optical microscope image of 50 magnifications (FIG. 9A) and an optical microscope image of 200 magnifications (FIG. 9B) for the pattern film according to Comparative Example 1 of the present application, and the result of diffraction evaluation thereon. Specifically, comprising a regular rectangular-shaped spacer pattern comprising the ball spacer and the partition wall spacer was identified from the results of the optical microscope images, and a cured area caused by an overcuring phenomenon that may form around the spacer pattern was observed.

Comparative Example 2

A pattern film was formed in the same manner as in Example 1 except that the mask design (light shielding layer pattern pitch 1100 μm) was changed.

The prepared partition wall spacer had a height of approximately 8.2 μm to 8.4 μm with an average of approximately 8.3 μm, and the line width was measured to be approximately 20 μm to 25 μm with an average of approximately 22.4 μm.

In addition, the ratio of the area having the tetragonally arranged partition wall spacer pattern (mesh pattern) present on the first base layer surface was approximately 4.0%. Herein, a standard deviation of the height of the spacer pattern was approximately 0.1 μm, and a standard deviation of the diameter of the ball spacer was approximately 0.98 μm.

FIGS. 10A to 10B are diagrams showing an optical microscope image of 50 magnifications (FIG. 10A) and an optical microscope image of 200 magnifications (FIG. 10B) for the pattern film according to Comparative Example 2 of the present application, and the result of diffraction evaluation thereon. Specifically, comprising a regular rectangular-shaped spacer pattern comprising the ball spacer and the partition wall spacer was identified from the results of the optical microscope images, and manufacturing without an overcuring phenomenon that may form around the spacer pattern or disconnection of the pattern was identified.

Evaluation on Devices of Example 1, Example 2, Comparative Example 1 and Comparative Example 2

On each of the tetragonally arranged partition wall spacer pattern films of Example 1, Example 2, Comparative Example 1 and Comparative Example 2, a vertical alignment film (Nissan Corporation, 5661LB3) was coated and dried (100° C.). In addition to the pattern, a vertical alignment film (JSR Corporation, R4) was also formed on, in a monoaxially elongated PET (polyethylene terephthalate) base film having a non-crystalline ITO (indium tin oxide) electrode layer formed on the surface, the electrode layer in the same manner, and as a result, a first laminate was formed.

After that, an adhesive having vertical alignment force (Si-OCA: Shin-Etsu Chemical, product name: KR-3700) was coated and dried on an ITO layer on a second base layer to prepare a second laminate.

The first laminate and the second laminate formed above were disposed to face each other while maintaining a space by the spacer pattern, and after injecting a liquid crystal composition into the space, the edge was sealed to manufacture a transmittance variable device.

The liquid crystal composition was injected using a lamination method, and as the liquid crystal composition, a mixed liquid crystal (liquid crystal: JNC, product name: SHN-7002XX T12/chiral additive: Merck, product name S811/dye: BASF, product name: X12) was used.

An appearance of the manufactured transmittance variable device was evaluated in a state after applying 40 V using a power supply (Kikusui Electronics Corporation, PCR500M). Specifically, FIG. 11 is a diagram showing an appearance in a state after applying 40 V to the transmittance variable device using the pattern film of Example 1, FIG. 12 is a diagram showing an appearance in a state after applying 40 V to the transmittance variable device using the pattern film of Example 2, FIG. 13 is a diagram showing an appearance in a state after applying 40 V to the transmittance variable device using the pattern film of Comparative Example 1, and FIG. 14 is a diagram showing an appearance in a state after applying 40 V to the transmittance variable device using the pattern film of Comparative Example 2.

It was identified that the transmittance variable devices using the pattern films of Example 1 and Example 2 had a clean appearance without defects in the alignment, however, in Comparative Example 1, black dots caused by alignment defects were observed as a cured area caused by an overcuring phenomenon was formed. Although an overcuring phenomenon did not occur in Comparative Example 2, it was identified that many black spots were generated due to non-uniformity of alignment film coating by a low pattern area ratio of the spacer pattern of the pattern film.

Example 3

A process for preparing a pattern film was the same as in Example 1, and differences in the constituents (light shielding layer mask design, ball spacer, composition optical density and the like) are as follows.

A black ball spacer and a darkening material were mixed to a binder commonly used in partition wall spacer preparation as a binder comprising a UV curable acrylate compound, a polymerization initiator and a dispersant to prepare a curable composition. Herein, as the black ball spacer, a black ball spacer (manufacturer: Sekisui Chemical, product name: KBN 506) having an average particle diameter of approximately 6 μm, a CV (coefficient of variation) of 4, and a standard deviation of the particle diameter of approximately 0.24 μm was used. The black ball spacer was mixed in 2.5 parts by weight with respect to 100 parts by weight of the binder. In addition, as the darkening material, carbon black was mixed in a ratio of approximately 3% by weight in the material. The prepared composition was identified to have optical density (OD) of approximately 1.0.

As the mask used, a mask having a shape in which a patterned light shielding layer (AgX, X=Cl, F, Br or I) and a release layer are consecutively formed on a PET film, a transparent base film, was used as illustrated in FIG. 6. Herein, the light shielding layer pattern has a hexagonal arrangement rule. For example, a state of disposing 100 dots on a base layer having a total area of approximately 10 mm each with a constant space (normal pitch) of 940 μm was assumed (state of normal disposition). Herein, a cross-sectional area of the bottom of the individual dot was adjusted to approximately 65 μm. Then, the individual dots were connected by a line to form a tetragonally arranged partition wall spacer pattern (mesh pattern) having a line width of approximately 65 μm.

The prepared hexagonally arranged partition wall spacer had a height of approximately 6.1 μm to 6.3 μm with an average of approximately 6.2 μm, and the line width was measured to be approximately 70 μm to 76 μm with an average of approximately 73.7 μm.

In addition, the ratio of the area having the hexagonally arranged spacer pattern (honeycomb pattern) present on the first base layer surface was approximately 15.1%. Herein, a standard deviation of the height of the spacer pattern was approximately 0.1 μm, and a standard deviation of the diameter of the ball spacer was approximately 1.0 μm.

FIGS. 15A to 15B are diagrams showing an optical microscope image of 50 magnifications (FIG. 15A) and an optical microscope image of 200 magnifications (FIG. 15B) for the pattern film according to Example 3 of the present application, and the result of diffraction evaluation thereon. Specifically, comprising a regular hexagonal-shaped spacer pattern comprising the ball spacer and the partition wall spacer was identified from the results of the optical microscope images, and although a cured area caused by an overcuring phenomenon that may form around the spacer pattern was partly observed, it was partly present only at the intersection, and manufacturing without disconnection was identified.

Example 4

A pattern film was formed in the same manner as in Example 3 except that the mask design (light shielding layer pattern line width 41 μm) was changed.

The prepared partition wall spacer had a height of approximately 6.1 μm to 6.3 μm with an average of approximately 6.2 μm, and the line width was measured to be approximately 42 μm to 48 μm with an average of approximately 45.6 μm.

In addition, the ratio of the area having the hexagonally arranged partition wall spacer pattern (honeycomb pattern) present on the first base layer surface was approximately 9.5%. Herein, a standard deviation of the height of the spacer pattern was approximately 0.1 μm, and a standard deviation of the diameter of the ball spacer was approximately 0.9 μm.

FIGS. 16A to 16B are diagrams showing an optical microscope image of 50 magnifications (FIG. 16A) and an optical microscope image of 200 magnifications (FIG. 16B) for the pattern film according to Example 4 of the present application, and the result of diffraction evaluation thereon. Specifically, comprising a regular hexagonal-shaped spacer pattern comprising the ball spacer and the partition wall spacer was identified from the results of the optical microscope images, and although a cured area caused by an overcuring phenomenon that may form around the spacer pattern was partly observed, it was partly present only at the intersection, and manufacturing without disconnection was identified.

Comparative Example 3

A pattern film was formed in the same manner as in Example 3 except that the mask design (light shielding layer pattern line width 21 μm, pitch 280 μm) was changed.

The prepared partition wall spacer had a height of approximately 6.1 μm to 6.3 μm with an average of approximately 6.2 μm, and the line width was measured to be approximately 35 μm to 41 μm with an average of approximately 38.3 μm.

In addition, the ratio of the area having the hexagonally arranged partition wall spacer pattern (honeycomb pattern) present on the first base layer surface was approximately 25.5%. Herein, a standard deviation of the height of the spacer pattern was approximately 0.1 μm, and a standard deviation of the diameter of the ball spacer was approximately 0.9 μm.

FIGS. 17A to 17B are diagrams showing an optical microscope image of 50 magnifications (FIG. 17A) and an optical microscope image of 200 magnifications (FIG. 17B) for the pattern film according to Comparative Example 3 of the present application, and the result of diffraction evaluation thereon. Specifically, comprising a regular rectangular-shaped spacer pattern comprising the ball spacer and the partition wall spacer was identified from the results of the optical microscope images, and a cured area caused by an overcuring phenomenon that may form around the spacer pattern was observed.

Comparative Example 4

A pattern film was formed in the same manner as in Example 3 except that the mask design (light shielding layer pattern line width 21 μm, pitch 1169 μm) was changed.

The prepared partition wall spacer had a height of approximately 6.1 μm to 6.3 μm with an average of approximately 6.2 μm, and the line width was measured to be approximately 25 μm to 35 μm with an average of approximately 27.7 μm.

In addition, the ratio of the area having the hexagonally arranged partition wall spacer pattern (honeycomb pattern)

present on the first base layer surface was approximately 4.7%. Herein, a standard deviation of the height of the spacer pattern was approximately 0.1 μm, and a standard deviation of the diameter of the ball spacer was approximately 0.9 μm.

FIGS. 18A to 18B are diagrams showing an optical microscope image of 50 magnifications (FIG. 18A) and an optical microscope image of 200 magnifications (FIG. 18B) for the pattern film according to Comparative Example 2 of the present application, and the result of diffraction evaluation thereon. Specifically, comprising a regular rectangular-shaped spacer pattern comprising the ball spacer and the partition wall spacer was identified from the results of the optical microscope images, and manufacturing without an overcuring phenomenon that may form around the spacer pattern or disconnection of the pattern was identified.

Evaluation on Devices of Example 3, Example 4, Comparative Example 3 and Comparative Example 4

Transmittance variable films were manufactured in the same manner as in Example 1, Example 2, Comparative Example 1 and Comparative Example 2 except that the hexagonally arranged partition wall spacer pattern films of Example 3, Example 4, Comparative Example 3 and Comparative Example 4 were used.

An appearance of the manufactured transmittance variable device was evaluated in a state before applying 40 V (0V) using a power supply (Kikusui Electronics Corporation, PCR500M). Specifically, FIG. 19 is a diagram showing an appearance in a state before applying 40 V (0V) to the transmittance variable device using the pattern film of Example 3, FIG. 20 is a diagram showing an appearance in a state before applying 40 V (0V) to the transmittance variable device using the pattern film of Example 4, FIG. 21 is a diagram showing an appearance in a state before applying 40 V (0V) to the transmittance variable device using the pattern film of Comparative Example 3, and FIG. 22 is a diagram showing an appearance in a state before applying 40 V (0V) to the transmittance variable device using the pattern film of Comparative Example 4.

It was identified that the transmittance variable devices using the pattern films of Example 3 and Example 4 had a clean appearance without defects in the alignment, however, in Comparative Example 3, black dots caused by alignment defects were observed as a cured area caused by an overcuring phenomenon was formed. Although an overcuring phenomenon did not occur in Comparative Example 4, contrast defects caused by non-uniformity of the liquid crystal height occurred, and it was identified that this was due to a difference in the pattern part and the liquid crystal height in the central part between the patterns, which is caused from a pattern film sagging phenomenon due to the low pattern area ratio.

The invention claimed is:

1. A pattern film, comprising:
a first base layer; and
a spacer patterns formed on the first base layer,
wherein the spacer pattern comprises a partition wall spacer and a ball spacer,
wherein the ball spacer is one of embedded in, partially embedded in or in contact with the partition wall spacer, and
wherein a unit area ratio of a unit area of the spacer pattern to a unit area of the first base layer is 5% or greater to 17% or less.

2. The pattern film of claim 1, wherein a line width (T) of the partition wall of the partition wall spacer and an average particle diameter (D) of the ball spacer satisfy the following Equation 1:

$$1.0 \leq T/D \leq 20. \qquad [\text{Equation 1}]$$

3. The pattern film of claim 1, wherein the first base layer is an inorganic base layer or an organic base layer.

4. The pattern film of claim 1, wherein the spacer pattern has optical density of 0.4 or greater and 4 or less.

5. The pattern film of claim 1, wherein the partition wall of the partition wall spacer has a line width of 10 μm or greater and 200 μm or less.

6. The pattern film of claim 1, wherein an average value of a height of the partition wall spacer is 2 μm or greater and 100 μm or less, and a standard deviation of the height of the partition wall spacer is 0.05 μm or greater and 0.5 μm or less.

7. The pattern film of claim 1, wherein a standard deviation of a particle diameter of the ball spacer is 0.8 μm or less.

8. The pattern film of claim 1, wherein the spacer pattern is an irregular pattern.

9. A transmittance variable device comprising:
the pattern film of claim 1; and
a second substrate disposed opposite to the pattern film, wherein the first base layer of the pattern film and the second substrate are separated by a space, wherein the space is maintained by the spacer pattern.

10. The transmittance variable device of claim 9, wherein the second substrate comprises:
a second base layer;
a transparent layer disposed on the second base layer; and
an adhesive layer disposed on the transparent layer, wherein the adhesive layer is in contact with the spacer pattern.

11. The transmittance variable device of claim 9, further comprising an alignment film, wherein the alignment film covers the spacer pattern.

12. The transmittance variable device of claim 9, further comprising a light modulation layer provided in the space.

13. The transmittance variable device of claim 10, wherein the adhesive layer comprises an adhesive having vertical alignment force.

14. The transmittance variable device of claim 12, wherein the light modulation layer comprises a liquid crystal compound and a dichroic dye.

15. A method for manufacturing a transmittance variable device, the method comprising:
preparing a first laminate by forming an alignment film on the spacer pattern of the pattern film of claim 1 to cover the spacer pattern;
laminating the first laminate and a second laminate wherein the second laminate comprises a second base layer, a transparent layer disposed on the second base layer, and an adhesive layer disposed on the transparent layer, wherein the adhesive layer of the second laminate is in contact with the alignment film of the first laminate, wherein the spacer pattern maintains a space between the first base layer of the first laminate and the adhesive layer of the second laminate; and
forming a light modulation layer in the space.

* * * * *